(12) United States Patent
Lamkin et al.

(10) Patent No.: US 8,334,337 B2
(45) Date of Patent: Dec. 18, 2012

(54) COMPOSITION AND MANUFACTURING METHODS FOR GRIPS

(75) Inventors: Robert J. Lamkin, San Diego, CA (US); David Claas, San Diego, CA (US); Christopher A. Lee, San Diego, CA (US); Miguel Angel Bravo, Tecate (MX); Maria Ramirez, Tijuana (MX); Patricia Marquez, Tijuana (MX); Roberto Rodriguez, Tijuana (MX); Carlos Rodriguez, Tijuana (MX); Moises Lucero, Tijuana (MX); Feliciano Guillen, Tijuana (MX); Iran Saenz, Tijuana (MX); Andrew Kerr, San Diego, CA (US); Ernesto Castro, Tijuana (MX)

(73) Assignee: Lamkin Corporation, San Diego, CA (US)

( * ) Notice: Subject to any disclaimer, the term of this patent is extended or adjusted under 35 U.S.C. 154(b) by 0 days.

(21) Appl. No.: 13/153,086

(22) Filed: Jun. 3, 2011

(65) Prior Publication Data

US 2012/0065314 A1  Mar. 15, 2012

Related U.S. Application Data

(60) Provisional application No. 61/382,800, filed on Sep. 14, 2010.

(51) Int. Cl.
*C09B 67/00* (2006.01)
*C08K 3/26* (2006.01)
(52) U.S. Cl. ........................... 524/502; 524/426
(58) Field of Classification Search .................. 524/502
See application file for complete search history.

(56) References Cited

U.S. PATENT DOCUMENTS

| | | | | |
|---|---|---|---|---|
| 3,028,283 | A | * | 4/1962 | Lundgren et al. ............. 264/245 |
| 5,187,224 | A | * | 2/1993 | Hamanaka et al. ........... 524/505 |
| 5,482,993 | A | * | 1/1996 | Hiraoka ........................ 524/789 |
| 5,559,169 | A | | 9/1996 | Belmont et al. |
| 5,981,649 | A | * | 11/1999 | Hiraoka et al. ............... 524/525 |
| 6,235,134 | B1 | | 5/2001 | Mueller |
| 6,310,158 | B1 | | 10/2001 | Ishikawa et al. |
| 6,372,323 | B1 | | 4/2002 | Kobe et al. |
| 6,489,402 | B2 | | 12/2002 | Ohyama et al. |
| 6,610,382 | B1 | | 8/2003 | Kobe et al. |
| 6,904,615 | B2 | | 6/2005 | Kobe et al. |
| 7,309,519 | B2 | | 12/2007 | Scholz et al. |

FOREIGN PATENT DOCUMENTS

JP  62224383  * 10/1987

OTHER PUBLICATIONS

Abstract of JP62-224383, Oct. 2, 1987.*

* cited by examiner

*Primary Examiner* — Hui Chin
(74) *Attorney, Agent, or Firm* — Procopio, Cory, Hargreaves & Savitch LLP

(57) ABSTRACT

A composition for use in grips is disclosed. The composition may be used, for example, in making a golf club grip. The disclosed grip provides for improved shock absorption and other beneficial properties. In one embodiment the comprises a cross-linked composition of from about 40% by weight to about 80% by weight of one or a combination of a first material selected from the group consisting of butyl rubber, nitrile rubber, ethylene propylene rubber and chloroprene rubber, and from about 10% by weight to about 50% by weight of one or a combination of a second material selected from the group consisting of ethylene-propylene-diene copolymer (EPDM), polyurethane, ethylene-vinyl acetate copolymer, polypropylene and cork.

12 Claims, 16 Drawing Sheets

TABLE 1

| | % Resilience Comparison (Butyl vs. EPDM) | | | | | | |
|---|---|---|---|---|---|---|---|
| Test | A | B | C | C-1 | D | E | F |
| Butyl 365 (%) | 0 | 20 | 40 | 50 | 60 | 80 | 100 |
| EPDM (%) | 100 | 80 | 60 | 50 | 40 | 20 | 0 |
| Rebound (mm) | | | | | | | |
| Value 1 | 38 | 33 | 32 | 18 | 12 | 9 | 6 |
| Value 2 | 37 | 32 | 33 | 18 | 13 | 9 | 5 |
| Value 3 | 38 | 32 | 33 | 18 | 13 | 9 | 5 |
| Value 4 | 40 | 33 | 33 | 19 | 14 | 9 | 6 |
| Value 5 | 39 | 33 | 33 | 19 | 13 | 9 | 5 |
| Average | 38 | 33 | 33 | 18 | 13 | 9 | 5 |
| Std.Dev. | 1.14 | 0.55 | 0.45 | 0.55 | 0.71 | 0 | 0.55 |
| C.V. | 0.0297 | 0.0168 | 0.0136 | 0.0298 | 0.0544 | 0 | 0.1014 |

TABLE 2

| Butyl % | Rebound Height (Avg in mm) | Rebound % (Referenced to Rebound Height) | Absorption % (Referenced to Rebound %) |
|---|---|---|---|
| 0 | 38 | 100 | 0 |
| 20 | 33 | 86.8 | 13.2 |
| 40 | 33 | 86.8 | 13.2 |
| 50 | 18 | 47.4 | 52.6 |
| 60 | 13 | 34.2 | 65.8 |
| 80 | 9 | 23.7 | 76.3 |
| 100 | 5 | 13.2 | 86.8 |

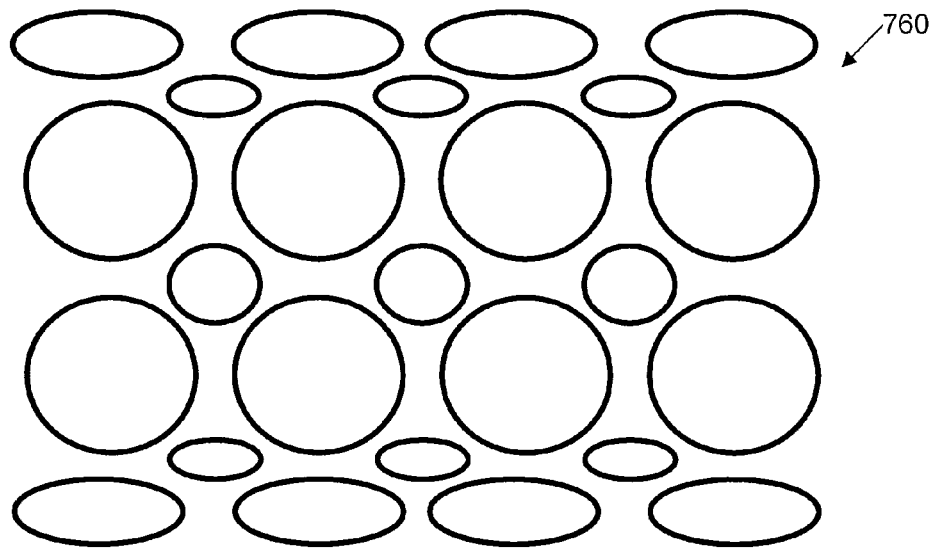
FIG. 7B
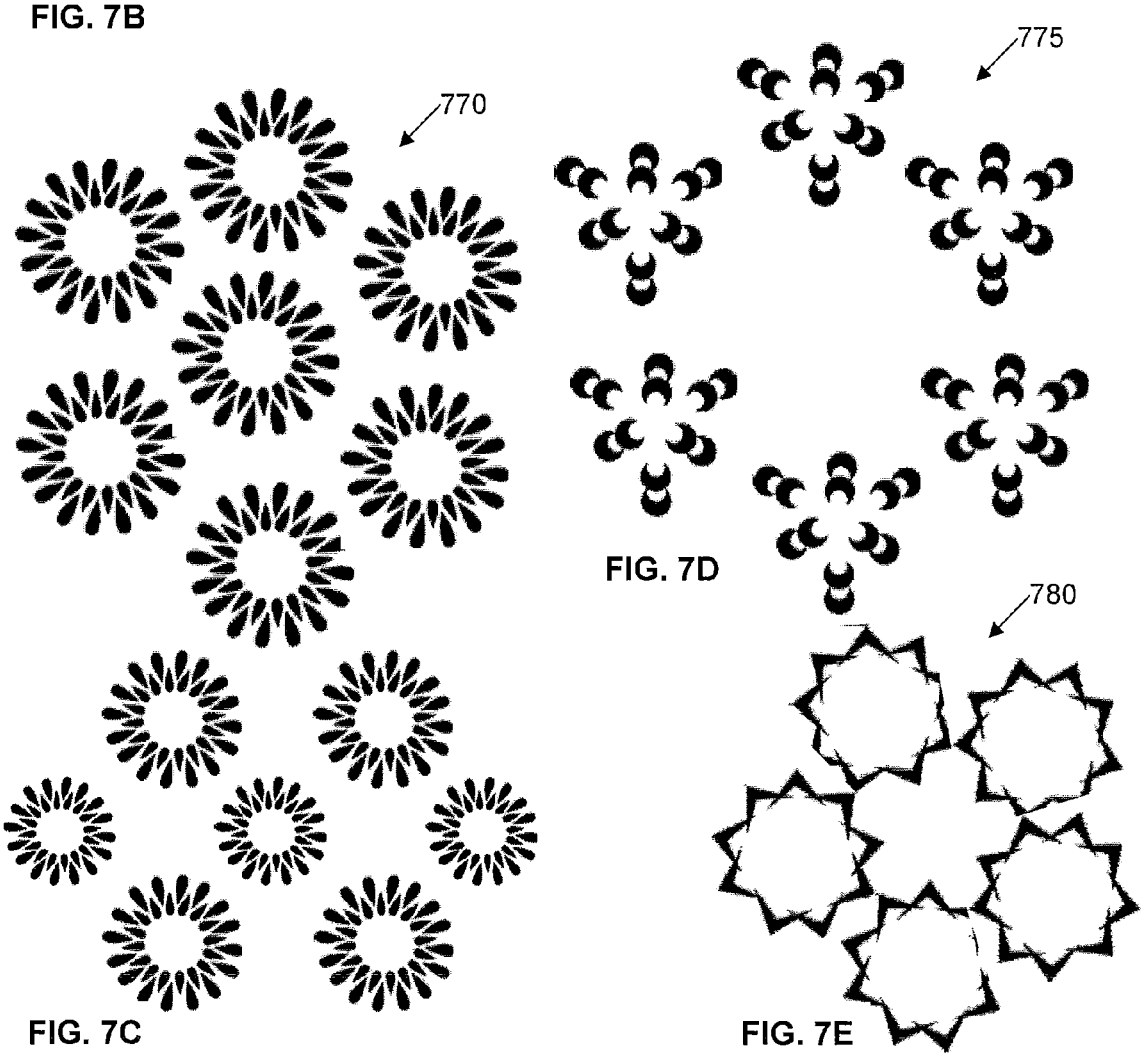
FIG. 7C
FIG. 7D
FIG. 7E

1001 N-DUR STD GRIP

| LOCATION | OFF SHAFT OD | TAPER |
|---|---|---|
| 0.2 | 1.091 | 0.110 |
| 1 | 0.982 | 0.072 |
| 2 | 0.910 | 0.073 |
| 3 | 0.837 | 0.033 |
| 4 | 0.804 | 0.026 |
| 5 | 0.778 | 0.011 |
| 6 | 0.767 | 0.012 |
| 7 | 0.755 | 0.000 |
| 8 | 0.755 | 0.022 |
| 9 | 0.733 | 0.050 |
| 10 | 0.683 | |

855

1028 R.E.L GRIP

| LOCATION | OFF SHAFT OD | TAPER |
|---|---|---|
| 0.5 | 1.076 | 0.073 |
| 1 | 1.003 | 0.094 |
| 2 | 0.909 | 0.046 |
| 3 | 0.864 | 0.034 |
| 4 | 0.830 | 0.032 |
| 5 | 0.797 | 0.029 |
| 6 | 0.768 | 0.021 |
| 7 | 0.747 | 0.016 |
| 8 | 0.731 | 0.020 |
| 9 | 0.711 | 0.027 |
| 10 | 0.684 | |

865

988 PERFORMANCE PLUS STD GRIP

| LOCATION | OFF SHAFT OD | TAPER |
|---|---|---|
| 0.25 | 1.144 | 0.123 |
| 1 | 1.021 | 0.087 |
| 2 | 0.934 | 0.058 |
| 3 | 0.877 | 0.055 |
| 4 | 0.822 | 0.024 |
| 5 | 0.799 | 0.001 |
| 6 | 0.797 | 0.004 |
| 7 | 0.793 | 0.003 |
| 8 | 0.790 | 0.016 |
| 9 | 0.775 | 0.034 |
| 10 | 0.741 | |

885

991 PERFORMANCE PLUS MIDSIZE GRIP

| LOCATION | OFF SHAFT OD | TAPER |
|---|---|---|
| 0.2 | 1.157 | 0.118 |
| 1 | 1.040 | 0.086 |
| 2 | 0.953 | 0.049 |
| 3 | 0.904 | 0.039 |
| 4 | 0.865 | 0.028 |
| 5 | 0.837 | 0.013 |
| 6 | 0.824 | 0.003 |
| 7 | 0.821 | 0.010 |
| 8 | 0.811 | 0.025 |
| 9 | 0.787 | |

1001 N-DUR STD GRIP

| LOCATION | ON SHAFT OD | TAPER |
|---|---|---|
| 0.2 | 1.107 | 0.088 |
| 1 | 1.019 | 0.064 |
| 2 | 0.955 | 0.051 |
| 3 | 0.904 | 0.035 |
| 4 | 0.869 | 0.022 |
| 5 | 0.847 | 0.009 |
| 6 | 0.838 | 0.015 |
| 7 | 0.823 | 0.005 |
| 8 | 0.818 | 0.022 |
| 9 | 0.796 | 0.027 |
| 10 | 0.769 | |

1028 R.E.L GRIP

| LOCATION | ON SHAFT OD | TAPER |
|---|---|---|
| 0.5 | 1.097 | 0.074 |
| 1 | 1.023 | 0.087 |
| 2 | 0.936 | 0.047 |
| 3 | 0.889 | 0.041 |
| 4 | 0.848 | 0.022 |
| 5 | 0.826 | 0.023 |
| 6 | 0.803 | 0.008 |
| 7 | 0.795 | 0.017 |
| 8 | 0.778 | 0.021 |
| 9 | 0.757 | 0.014 |
| 10 | 0.743 | |

988 PERFORMANCE PLUS STD GRIP

| LOCATION | ON SHAFT OD | TAPER |
|---|---|---|
| 0.25 | 1.146 | 0.109 |
| 1 | 1.037 | 0.085 |
| 2 | 0.952 | 0.052 |
| 3 | 0.900 | 0.042 |
| 4 | 0.858 | 0.023 |
| 5 | 0.835 | 0.017 |
| 6 | 0.818 | 0.005 |
| 7 | 0.813 | 0.009 |
| 8 | 0.804 | 0.013 |
| 9 | 0.791 | 0.018 |
| 10 | 0.773 | |

991 PERFORMANCE PLUS MIDSIZE GRIP

| LOCATION | ON SHAFT OD | TAPER |
|---|---|---|
| 0.2 | 1.174 | 0.098 |
| 1 | 1.076 | 0.092 |
| 2 | 0.984 | 0.046 |
| 3 | 0.938 | 0.044 |
| 4 | 0.894 | 0.024 |
| 5 | 0.870 | 0.019 |
| 6 | 0.851 | 0.009 |
| 7 | 0.842 | 0.014 |
| 8 | 0.828 | 0.009 |
| 9 | 0.819 | |

FIG. 8

|  | Vib Damping | Ozone Resistance | Wear Resistance | Hardness (Shore A) |
| --- | --- | --- | --- | --- |
| butyl rubber | 1 | 1 | 2 | 40 - 90 |
| chloroprene rubber | 3 | 3 | 2 | 20 - 95 |
| ep rubber | 3 | 1 | 2 | 30 - 90 |
| EPDM | 3 | 1 | 2 | 30 - 90 |
| ethylene-vinyl acetate | 2 - 3 | 2 | 1 - 2 | 40 - 100+ |
| halogenated butyl - Cl, Br | 2 | 1 | 2 | 40 - 90 |
| nitrile rubber | 3 | 4 | 2 | 20 - 95 |
| polypropylene | 3 | 3 | 1 | >100 |
| polyurethane | 1 - 3 | 1 | 1 - 2 | 30 - 95 |
| SBR | 2 | 4 | 1 | 30 - 95 |
| Sorbothane | 1 | 1 | 1 - 2 | 30 - 70 |

1 = Very good, 2 = Good, 3 = Fair, 4 = Poor

FIG. 9

COMPOSITION AND MANUFACTURING METHODS FOR GRIPS

This application claims priority to U.S. Provisional Patent Application No. 61/382,800, filed on Sep. 14, 2010, having the title "COMPOSITION AND MANUFACTURING METHODS FOR GRIPS", the entire contents of which is incorporated herein by reference.

FIELD

The invention relates to grips and more particularly to compositions for use in grips.

BACKGROUND

Many types of sporting equipment use a grip as an interface between a user and a piece of equipment. For example, golf clubs have grips which are held by a player during use. The properties of a grip can significantly affect the quality of experience and performance for a user. For example, in golf, the properties of the grip can significantly affect the player's experience. Poor grips can lead to dangerous situations where a player can lose control of a club. Poor grips can also lead to injury from excessive or repeated transfer of shock to a user after striking a ball. Grips which provide inadequate traction to the golfer's hands, or inappropriate hardness or torsional stiffness, encourage less relaxed hand pressure, which leads to degraded swing technique and ball flight. Thus it is desirable to provide a grip that provides a superior user experience while maximizing safety and comfort.

SUMMARY

Various embodiments of the invention are described herein.

In one embodiment, a grip for a golf club is provided. The grip comprises a cross-linked composition of from about 5% by weight to about 40% by weight of one or a combination of a viscoelastic rubber selected from the group consisting of butyl rubber, nitrile rubber, ethylene propylene rubber and chloroprene rubber, and from about 10% by weight to about 80% by weight of one or a combination of a non-rubber viscoelastic material selected from the group consisting of ethylene-propylene-diene copolymer (EPDM), polyurethane, ethylene-vinyl acetate copolymer, polypropylene and cork.

In another embodiment, a composition for enhancing the rebound and shock-absorbing characteristics of a golf club grip is provided. The composition comprises a mixture of a) from about 5% by weight to about 40% by weight of one or a combination of a viscoelastic rubber selected from the group consisting of butyl rubber, nitrile rubber, ethylene propylene rubber and chloroprene rubber and b) from about 10% by weight to about 80% by weight of one or a combination of a non-rubber viscoelastic material selected from the group consisting of ethylene-propylene-diene copolymer (EPDM), polyurethane, ethylene-vinyl acetate copolymer, polypropylene and cork a silicone polymer micro emulsion.

In another embodiment, a vibration dampening composition is provided. The composition comprises a cross-linked composition of from about 5% by weight to about 40% by weight of one or a combination of a viscoelastic rubber selected from the group consisting of butyl rubber, nitrile rubber, ethylene propylene rubber and chloroprene rubber, and from 10% by weight to 80% by weight of one or a combination of a non-rubber viscoelastic material selected from the group consisting of ethylene-propylene-diene copolymer (EPDM), polyurethane, ethylene-vinyl acetate copolymer, polypropylene and cork. The composition has a rebound from about 85 percent to about 98 percent and an absorption from about 13 percent to about 76 percent.

In another embodiment, a grip for a golf club is provided. The grip comprises a cross-linked composition of from about 40% by weight to about 80% by weight of one or a combination of a first material selected from the group consisting of butyl rubber, nitrile rubber, ethylene propylene rubber and chloroprene rubber, and from about 10% by weight to about 50% by weight of one or a combination of a second material selected from the group consisting of ethylene-propylene-diene copolymer (EPDM), polyurethane, ethylene-vinyl acetate copolymer, polypropylene and cork.

BRIEF DESCRIPTION OF THE DRAWINGS

FIG. 7A-J show views of grip surface patterns according to an embodiment;

FIG. 8 shows taper patterns for a plurality of grips according to an embodiment; and FIG. 9 shows a table of materials and properties according to an embodiment.

DETAILED DESCRIPTION OF THE INVENTION

Figure 1A:
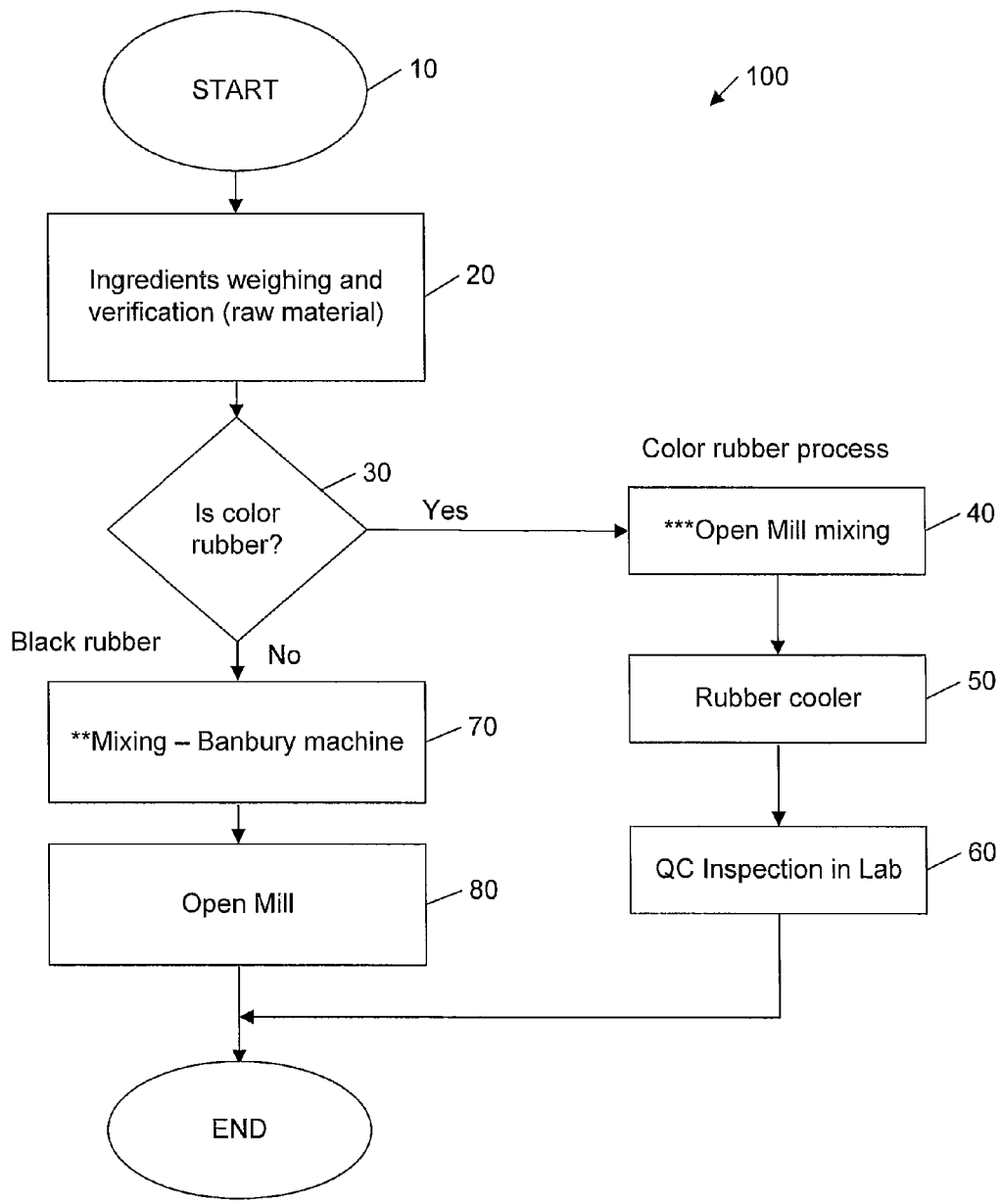
FIG. 1A shows a process for creating a composition according to an embodiment.

Disclosed herein are compositions suitable for making various grips. As one example, these grips are particularly suited for mounting on golf clubs. The composition may also be used in other products. For example, the composition may be used to create a grip for sporting equipment such as a golf club, tennis racquet, or baseball bat. The composition may also be used to create grips for other equipment such as gardening tools, heavy equipment like jack hammers, vehicle steering wheels. The composition may also be used to make a grip or recoil pad for firearms. Other uses are also possible. Applicants have surprisingly found the compositions exhibit superior properties that result in an improved golf grip. The composition can provide, for example, superior vibration dampening and other grip properties that are retained even after extensive use and cleaning.

The compositions may, in some embodiments, include a mixture of butyl rubber and EPDM. The compositions may, in some embodiments, include about 5% to about 40% by weight butyl rubber. In some embodiments, the compositions include about 10% to about 25% by weight butyl rubber. In some embodiments, the compositions include about 10% to about 25% by weight butyl rubber. In some embodiments, the compositions include about 15% to about 20% by weight butyl rubber. Meanwhile, the compositions may, in some embodiments, include about 10% to about 80% by weight EPDM. In some embodiments, the compositions include about 20% to about 50% by weight EPDM. In some embodiments, the compositions include about 30% to about 40% by EPDM.

Butyl rubber is a copolymer that includes isobutylene with small amounts of isoprene as the monomer units. The amount of isoprene can be selected depending upon the extent of cross-linking desired for the compositions. In some embodiments, the butyl rubber includes about 0.1% to about 5% by weight isoprene relative to the weight isobutylene. In some embodiments, the butyl rubber includes about 0.5% to about 2.5% by weight isoprene relative to the weight isobutylene. In some embodiments, the butyl rubber includes at least about 70% by weight isobutylene. In some embodiments, the butyl rubber includes about 80% by weight isobutylene.

As would be understood by a person of ordinary skill, butyl rubber may include other monomer units—besides isobutylene and isoprene—without substantially modifying the copolymer's properties. In some embodiments, the butyl rubber includes no more than about 10% by weight of other monomer units. In some embodiments, the butyl rubber includes no more than about 5% by weight of other monomer units. In some embodiments, the butyl rubber includes no more than about 1% by weight of other monomer units. In some embodiments, the butyl rubber consists of, or consists essentially of, isobutylene and isoprene as the monomer units.

Butyl rubbers are commercially available. For example, various butyl rubbers are sold under the tradename EXXON BUTYL.

The butyl rubber may optionally be a halogenated butyl rubber. Thus, for example, the compositions may include a butyl rubber that is a brominated or chlorinated butyl rubber. Halogenated butyl rubbers can be obtained, for example, by contacting the uncross-linked butyl rubber with an appropriate halogen salt (e.g., hydrochloride or hydrobromide salt) and are commercially available under the tradename EXXON BROMOBUTYL or EXXON CHLOROBUTYL.

Additionally, the butyl rubber can optionally include a multifunctional coupling agent to obtain a comb polymer (also referred to as star or branched polymers). For example, the multifunctional coupling agent may be divinylbenzene. Comb polymers are commercially available, for example, under the tradename EXXON SB BUTYL.

The molecular weight of the butyl rubber is not particularly limited and may be selected to achieve appropriate processing conditions and mechanical properties. In some embodiments, the molecular weight is at least about 200,000 Da. In some embodiments, the butyl rubber exhibits a Mooney viscosity (ML 1+8 (125° C.)) in the range of about 25 to 35, and preferably about 32.

Without being bound to any particular theory, it is believed that butyl rubber imparts improved shock absorption (or resilience) to the compositions. Other materials that impart shock absorbing properties may be included without departing from the scope of the present application. These other shock absorbing materials may be included either alone or in combination with the butyl rubber. In some embodiments, the shock absorbing material is a viscoelastic material. As an example, certain known rubbers may be used as the shock absorbing material instead of butyl rubber. Thus, in some embodiments, the compositions include EPDM and a viscoelastic rubber. For example, the compositions may include EPDM and styrene-butadiene rubber. In some embodiments, the compositions include EPDM, butyl rubber and a viscoelastic rubber other than butyl rubber. For example, the compositions may include EPDM, butyl rubber, and styrene-butadiene rubber. Some examples of viscoelastic rubbers include, but are not limited to, ethylene-propylene rubber, nitrile rubber, and chloroprene rubber (neoprene).

The total amount of rubber (both butyl rubber and any other rubber) in the compositions is not limited and will vary depending upon the specific viscoelastic rubbers. The compositions may, in some embodiments, include about 5% to about 40% by weight of viscoelastic rubber. In some embodiments, the compositions include about 10% to about 25% by weight of viscoelastic rubber. In some embodiments, the compositions include about 10% to about 25% by weight of viscoelastic rubber. In some embodiments, the compositions include about 15% to about 20% by weight of viscoelastic rubber.

Any material having viscoelastic properties suitable for shock absorbing may be suitable, and therefore non-rubber materials may be included alone or in combination with a rubber (e.g., butyl rubber, nitrile rubber, etc.). As such, in some embodiments, the compositions include EPDM and a non-rubber viscoelastic material. In some embodiments, the compositions include EPDM, a non-rubber viscoelastic material, and a viscoelastic rubber (e.g., butyl rubber, nitrile rubber, etc.).

One example of a non-rubber viscoelastic material is SORBOTHANE (commercially available from Sorbothane, Inc.), which is a viscoelastic, polyether-based urethane. Accordingly, in some embodiments, the compositions may include EPDM and a viscoelastic polyurethane. In some embodiments, the compositions may include EPDM, viscoelastic polyurethane, and a viscoelastic rubber (e.g., butyl rubber, nitrile rubber, etc.).

Another example of a non-rubber viscoelastic material is LEVAPREN (commercially available from Lanxess), which is a viscoelastic copolymer that includes vinyl acetate and ethylene. Accordingly, in some embodiments, the compositions may include EPDM and a viscoelastic ethylene-vinyl acetate copolymer. In some embodiments, the compositions may include EPDM, ethylene-vinyl acetate copolymer, and a viscoelastic rubber (e.g., butyl rubber, nitrile rubber, etc.).

The compositions may also include polypropylene either alone or combined with a viscoelastic rubber (e.g., butyl rubber, nitrile rubber, etc.). SANTOPRENE (commercially available from Exxon) is a viscoelastic composition that includes EPDM and polypropylene. In some embodiments, the compositions include EPDM and polypropylene. In some embodiments, the compositions include EPDM, polypropylene, and a viscoelastic rubber (e.g., butyl rubber, nitrile rubber, etc.).

Cork is another example of a shock absorbing material within the scope of the present application. Cork may be used either alone or combined with a viscoelastic rubber. In some embodiments, the compositions include EPDM and cork. In some embodiments, the compositions include EPDM, cork and butyl rubber.

Foams are another example of a shock absorbing material within the scope of the present application. A foam may be used either alone or combined with a viscoelastic rubber. In some embodiments, the compositions include EPDM and a foam. Ethylene vinyl acetate (EVA), also known as expanded rubber or foam rubber, is a foam that be may be used as a shock absorbing material.

Meanwhile, EPDM is a copolymer including ethylene, propylene and a diene, such as dicyclopentadiene, ethylidene norbornene or vinyl norbornene, as monomer units. EPDM can include, in some embodiments, about 30% to about 90% by weight ethylene. In some embodiments, the EPDM includes about 45% to about 75% by weight ethylene. In some embodiments, the EPDM includes about 50% to about 65% by weight ethylene. Furthermore, the EPDM may include, in some embodiments, about 10% to about 70% by weight propylene. In some embodiments, the EPDM includes about 35% to about 55% by weight propylene. In some embodiments, the EPDM includes about 35% to about 50% by weight propylene.

The amount of diene in the EPDM can be selected depending upon the chemical structure of the diene and the desired level of cross-linking. Non-limiting examples of dienes that may be included as a monomer unit include 5-ethylidene-2-norbornene, dicyclopentadiene, 1,4-hexadiene, and the like. In some embodiments, the EPDM includes about 1% to about 15% by weight diene. In some embodiments, the EPDM includes about 2% to about 12.5% by weight diene. In some embodiments, the EPDM includes about 5% to about 10% by weight diene.

As would be understood by a person of ordinary skill, EPDM may include other monomer units—besides ethylene, propylene, and diene—without substantially modifying the copolymer's properties. In some embodiments, the EPDM includes no more than about 10% by weight of other monomer units. In some embodiments, the EPDM includes no more than about 5% by weight of other monomer units. In some embodiments, the EPDM includes no more than about 1% by weight of other monomer units. In some embodiments, the EPDM consists of, or consists essentially of, ethylene, propylene and diene as the monomer units.

The viscosity of the EPDM is also not particularly limited and may be selected to achieve desired processing conditions and mechanical properties. In some embodiments, the EPDM exhibits a Mooney viscosity (ML 1+4 (125° C.)) in the range of about 20 to 50.

Additionally, the EPDM may include other desirable characteristics. For example, the EPDM may have an average specific gravity of 1.10, hardness (Shore A) of 50, tensile strength (psi) of 1469.3, elongation at break (%/in) of 969.5, modulus at 100% (psi) of 147.8, modulus at 200% (psi) of 219.8, modulus at 300% (psi) of 306.7 etc. In other embodiments, EPDM may have an average specific gravity of 1.10, hardness (Shore A) of 50, tensile strength (psi) of 1470, elongation at break (%) of 970, modulus at 100% (psi) of 150, modulus at 200% (psi) of 220, modulus at 300% (psi) of 305 etc.

Various other ingredients may optionally be included within the compositions to improve the mechanical properties and processing of the composition. In some embodiments, the composition includes a cross-linking agent to cure the composition. Cross-linking agents may be included to impart complete and rapid recovery from mechanical deformation.

Numerous cross-linking agents are known to those skilled in the art. For example, the cross-linking agent may be sulfur, which can be used to vulcanize (or cross-link) polymers within the composition (e.g., butyl rubber and/or EPDM). As another example, the composition may include p-dinitrosobenzene, phenolic resins, or maleimides that will react with double bonds to form a cross-link. Many other methods of cross-linking agents are known in the art and are within the scope of the present application. In some embodiments, the cross-linking agent is sulfur.

The amount of cross-linking agent can vary considerably depending upon the selected cross-linking agent and desired mechanical properties. In some embodiments, the compositions include about 0.1% to about 10% by weight cross-linking agent. In some embodiments, compositions include about 0.5% to about 5% by weight cross-linking agent. In a preferred embodiment, compositions include about 1% to about 3% by weight cross-linking agent.

An accelerator and/or activator may optionally be included in the compositions to increase the rate and efficiency of the cross-linking reaction. 2-mercaptobenzothiazole and its derivatives are one example of accelerators that may be used in the compositions. Meanwhile, zinc oxide and stearic acid are non-limiting examples of activators. In some embodiments, the composition includes sulfur, an accelerator and activator.

Other ingredients can, in some embodiments, be included in the composition to improve processing. Various processing aids that are known in the art may added. As an example, a lubricant including fatty acid soaps and calcium (e.g., WB-16 which is commercially available from Struktol) can be added to improve flow properties and sticking. The total amount of processing aids in the compositions is not particularly limited, but can, in some embodiments, be no more than about 1% by weight. Also, a scorch retarder (or vulcanization inhibitor) may be included to delay the onset of cross-linking. N-(Cyclohexylthio)phthalimide (e.g., SANTOGARD PVI commercially available from Flexsys) is one example of a scorch retarder. The total amount of scorch retarder in the compositions is not particularly limited, but can, in some embodiments, be no more than about 1% by weight.

Various fillers may also be optionally included in the compositions. In some embodiments, the compositions may include about 10% to about 50% by weight filler. In some embodiments, the compositions may include about 15% to about 40% by weight filler. In some embodiments, the compositions may include about 20% to about 30% by weight filler.

Numerous fillers are known in the art for reinforcing rubber materials. Non-limiting examples of fillers include titanium dioxide, calcium carbonate, barium sulfate, silica, silicon dioxide, carbon black, sand, glass beads, mineral aggregates, talc, clay and the like. In some embodiments, the filler is silicon dioxide. In some embodiments, the filler is in a powder or powder form. In some embodiments, the filler has a specific surface area of about 100 $mm^2/g$ to about 150 $mm^2/g$ prior as determined by a BET method. In some embodiments, the filler has a specific surface area of about 130 $mm^2/g$ to about 140 $mm^2/g$ prior as determined by a BET method.

The filler can, in some embodiments, be a low-density filler. For example, the filler may have a density no more than about 0.7 $g/cc^3$. In some embodiments, the filler may have a density no more than about 0.6 $g/cc^3$. In some embodiments, the filler may have a density no more than about 0.5 $g/cc^3$. The low-density filler may also exhibit a crush strength (90% survival) of at least 1000 psi. One example of a low-density filler are compositions of glass or ceramic spheres having diameters less than 100 microns (e.g., Glass bubbles commercially available from 3M). Another example of a low-density filler are compositions of thermoplastic microspheres (e.g., EXPANCEL commercially available from Akzonobel).

The compositions may optionally include a foaming agent (or blowing agent) that imparts, for example, improved shock absorbing properties or reduced density. The foaming agent may be any suitable foaming agent for expanding the compositions. Non-limiting examples include organic foaming agents, such as dinitrosopentamethylenetetramine (DPT), azodicarbonamide (AZC), p-toluenesulfonyl hydrazide (TSH), 4,4'-oxybisbenzenesulfonyl hydrazide (OBSH), and the like, and inorganic foaming agents, such as sodium hydrogen carbonate.

In addition, the compositions may include a plasticizer. The plasticizer may be used, for example, to impart greater flexibility in the compositions. Numerous plasticizers are known in the art and are within the scope of the present application. Preferably, the plasticizer is a generally non-polar compound that can be sufficiently intermixed with EPDM and butyl rubber. Examples of generally non-polar plasticizers include, but are not limited to, napthenic oils, paraffinic oil, and aromatic plasticizers (e.g., di(octyl)phthalate). In some embodiments, the plasticizer is a hydrotreated napthenic distillate.

The amount of plasticizer in the compositions is not particularly limited and can be selected based upon the desired flexibility. In some embodiments, the compositions include about 0.1% to about 8% by weight plasticizer. In some embodiments, the compositions include about 1% to about 5% by weight plasticizer. In some embodiments, the compositions include about 2% to about 3% by weight plasticizer.

The compositions can also optionally include a tackifier resin. Non-limiting examples of tackifiers include resins and their derivates, terpenes and modified terpenes, C5 aliphatic resins, C9 aromatic resins, hydrogenated hydrocarbon resins, and terpene-phenol resins. A mixture of one or more resins can be used. In some embodiments, the compositions include about 0.1% to about 4% by weight tackifier resin. In some embodiments, the compositions include about 1% to about 2% by weight tackifier resin. In some embodiments, the tackifier resin includes a mixture of C5 aliphatic resins and C9 aromatic resins.

Various pigments can also be included in order to obtain the desired color for the composition. For example, a black color may be obtained by adding carbon, while a white color can be obtained using titanium dioxide, zinc oxide, or lithopone. Other useful inorganic pigments include, but are not limited to, cadmium sulfide selenide, iron oxides, cadmium sulfide, lead chromate, chromium oxide, ultramarine, cobalt blue, and the like. Organic pigments may also be included as desired. In some embodiments, the pigment is selected from carbon and titanium dioxide. The amount of pigment is not limited and will vary depending upon the selected pigment. In some embodiments, the compositions include no more than about 15% by weight pigment.

In addition to the main pigment(s) selected, additional cosmetic additives or pigments may be used to produce special effects. For example, certain pigments may provide the composition with a sparkly or iridescent look. Such pigments include, for example, sparkle pigment, iriodin color and high performance colors. As used herein, sparkle pigment is a generic name used to refer to pigments with semi-microscopic metallic particles that provide light reflection to colors (e.g., Silver or Gold). Iriodin is a commercial name for a product line of iridescent pigments available from Merck & Co. High performance colors is another product line for pearlescent pigments available from Merck & Co.

Although various components of the compositions are disclosed herein, it will be appreciated that other components may be included without departing from the scope of the present application.

Method of Making the Composition

The compositions of the present application may generally be obtained by intermixing the various components and applying conditions configured to cure the composition. In some embodiments, the process conditions are sufficient to obtain a homogenous dispersion of the various components. Sufficient intermixing is readily achieved by using mixing equipment well known in the art so as to obtain high shear. For example, such mixing can be obtained in an internal mixer such as a Banbury, on a two roll mill, in a continuous mixing extruder, high shear continuous mixer, etc. Those skilled in the art are familiar with the principles of controlling time, temperature and sequence of ingredients so as to maximize uniformity of dispersion of the components in the composition.

The various components may, for example, be intermixed at a pre-determined sequence in order to obtain sufficient dispersion. As one example, the polymers (e.g., EPDM and butyl rubber) may first be intermixed in a two-roll mill at elevated temperatures. Any fillers may subsequently be added to the two-roll mill and intermixed with the polymers, and then the optional plasticizers, activators, or processing aids can be added. Subsequently, any pigments can be intermixed into the mixture, and then any cross-linking agents, accelerators, and scorch retarders can be added.

Of course, a person of ordinary skill would recognize that the order of mixing is not critical. In some embodiments, the cross-linking agent is added after the polymers and fillers.

The mixing procedure may, in some embodiments, be completed at elevated temperatures. The temperature may be modified during various portions of the intermixing. For example, the temperature may be increased when adding filler to the composition relative to when adding the polymers. In some embodiments, the intermixing is completed at temperatures ranging from about 100° C. to about 250° C.

FIG. 1A depicts one example of a process for preparing the compositions of the present application. The process begins at start 10, and various raw materials are weighed 20. The intermixing process can vary depending upon the desired color. Accordingly, the appropriate mixing procedure may be determined at block 30 based, in part, upon the desired color for the composition. If the color is not black, then the raw materials may be intermixed using an open mill 40. The mixed materials may then be cooled 50 and subject to testing 60 to confirm composition exhibits the appropriate properties.

If the intended color is black, an alternative process is selected at block 30. The raw materials are intermixed using a Banbury mixer 70. The mixture is then subjected to an open mill 80. The intermixed compositions may optionally be subjected to additional processing to prepare a grip. These portions of FIG. 1A are discussed further in later section below.

EXAMPLES

Example 1

A composition was prepared with following components:
(i) 15-25% BUTYL 365 (Exxon-Mobil): butyl rubber including 94% isobutylene and 5% isoprene;
(ii) 10-20% EPDM 2340A (DSM): amorphous grade EPDM that includes 53% ethylene, 6% 5-ethylidene-2-norbornene (ENB);
(iii) 10-20% EPDM 4551A (DSM): semi-crystalline grade EPDM that include 64% ethylene, 50% oil, and 8.7% ENB and is mixed with equal parts oil;
(iv) 10-30% HI SIL 233 (PPG): 87% amorphous silicon dioxide;
(v) 2-4% NYTEX 530 (Nynas): hydrotreated heavy napthenic distillate;
(vi) 1-10% QUINTONE R-100 (Zeon chemicals): aliphatic petroleum hydrocarbon resin;
(vii) 1-4% Zinc oxide (Horsehead Corp.);
(viii) 0.2-1.0% Stearic acid (Cognis Oleochemicals, LLC);
(ix) 1.0-2.0% Polyethylene glycol (Dow Chemical);
(x) 0.05-0.3% WB-16: blend of fatty acid metal soap and an amide (Struktol);

(xi) 7-10% Titanium dioxide (Ishihara-Sangyo, Kaisha, Ltd.);

(xii) 0.01-0.1% DELTA PM (Akrochem): ~80% blended dithiocarbamates and ~20% sulfur;

(xiii) 0.1-1.0% PENNAC TM/ETD (Akrochem): Tetramethylthiuram disulfide/Tetraethylthiuram disulfide (TMTD/TETD);

(xiv) 0.1-1.0% ALTAX MBTS (R.T. Vanderbilt Co.): 94% benzothiazole disulfide and 6% mineral oil;

(xv) 0.05-0.1% SANTOGARD PVI (Flexsys): 97-99% N-(Cyclohexylthio)pthalimide and 0.5-1.5% butyl oleate;

(xvi) 0.5-1.0% Sulfur (Harwick-Standard).

Sample 1—

24.95% Butyl 365, 18.34% EPDM 2340A, 13.21% EPDM 4551, 16.97% Hi Sil 223, 3.00% Nytex 530, 4.60% Quintone R-100, 2.50% Zinc Oxide, 0.50% Stearic Acid, 1.69% Polyethylene Glycol, 0.10% WB-16, 12.47% Titanium Dioxide, 0.05% Delta PM, 0.50% Pennac TM/ETD, 0.25% Altax MBTS, 0.07% Santogard PVI, and 0.80% Sulfur.

The raw materials were intermixed in a two-roll mill in four stages to obtain a homogenous composition:
  (a) the polymers were mixed for about 10 minutes at 120-140° C.;
  (b) the fillers, plasticizers, activators, and process aids were added to the mixture of (a) and mixed for about 15 minutes at 140-160° C.;
  (c) the pigment was added to the mixture of (b) and mixed for about 5 minutes at 150-170° C.; and
  (d) the accelerators, cross-linking agent, and scorch retarder were added to the mixture of (c) and mixed for about 10 min at 140460° C.

Example 2

A composition is prepared using substantially the same process described in Example 1 except that 5-10% carbon black was included in the composition as the pigment instead of titanium dioxide. Furthermore, the composition is intermixed by adding all the ingredients to a Banbury mixer and mixing for about 2.5 minutes at 200-210° C. Subsequently, the composition is subjected to further mixing in a two-roll mill for about 5 minutes at 150-170° C. before cooling to 50° C.

Example 3

Figures 1B, 1C, 1D:
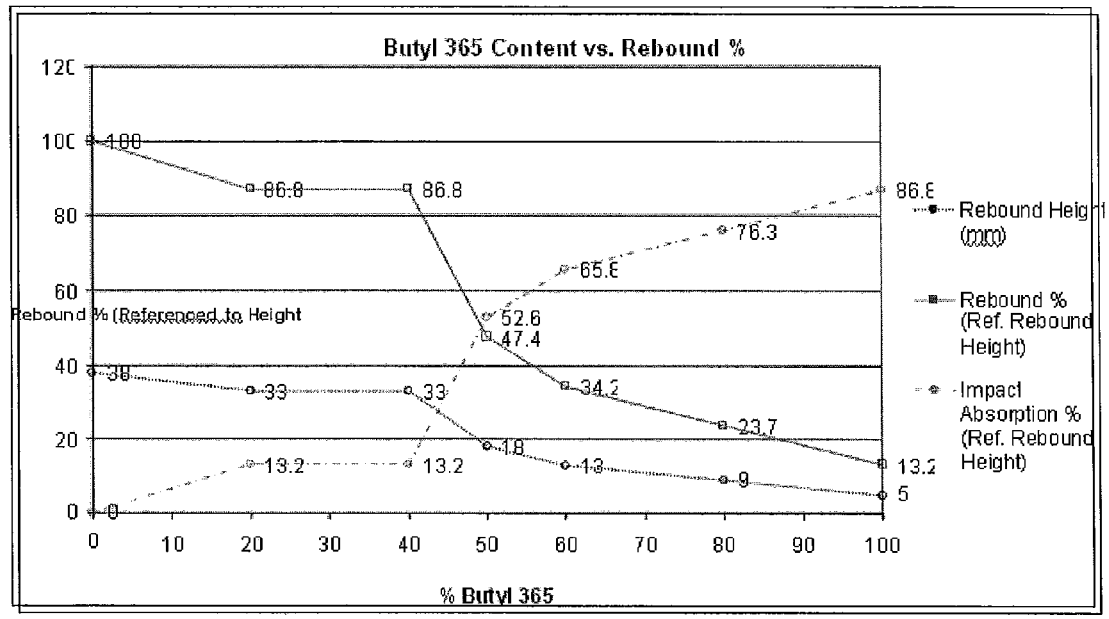
FIG. 1B-D show properties of a composition according to an embodiment.

The tables and chart below (FIGS. 1B-D) provide information related to the dampening effect of compositions produced in accordance with principles of the present invention. For example, FIG. 1B illustrates the % resilience of sample compositions made with varying levels of butyl and EPDM as the polymers. As would be expected, the sample compositions with greater amounts of EPDM are the most resilient.

The dampening effect was measured using a rebound apparatus built to resemble the one described in ASTM D 2632-96 "Standard Test Method for Rubber Property-Resilience by Vertical Rebound." The rebound apparatus basically includes a metal base holding a height scale (e.g., m) and a metallic vertical rod to guide the plunger which is dropped from a fixed height. The fall and rebound are guided by the rod. In order to minimize friction between the plunger and the guide, means are provided for leveling the base of the instrument. For example, means for leveling may include using a level having a leveling bubble, the level fastened between two screws. The apparatus may then be leveled by guiding the air bubble to the center by adjusting the screws.

By using this method, resilience is the determined as the ratio of rebound height to drop height of a metal plunger of prescribed weight and shape which is allowed to fall on the sample composition.

FIG. 1C is similar to FIG. 1B in that the sample compositions having greater amounts of EPDM (e.g., less amounts of butyl) are the most resilient or rebound better. As used herein, rebound % is defined as the release % of the total accumulated potential energy, stored in a body when it is forced to hit or be hit by another body or surface (e.g., this is potential energy transformed to kinetic energy). As used herein, impact absorption % is defined as the accumulated potential energy % stored but not allowed to transform into kinetic energy even if the body hits another body or surface or is hit by another body or surface.

From looking at FIG. 1C, if the sample composition having 0% butyl (e.g., 100% EPDM) is defined as having a rebound % of 100 and an absorption % of 0, then other sample compositions may be defined in terms of rebound % and absorption %, based on the 0% butyl sample (e.g., every other sample is defined based on a rebound height of 38 mm).

FIG. 1D illustrates three curves, rebound height (blue), rebound % (pink) and impact absorption % (orange). The rebound height curve is related to the % of butyl present in the sample composition (x-axis) and the rebound height in millimeters (y-axis). This curve shows how the rebound height decreases as the butyl % increases.

The rebound % curve is related to the % of butyl present in the sample composition (x-axis) and the rebound % is referenced to rebound height in millimeters (y-axis). This was calculated assuming that with 0% butyl, the rebound height was 38 mm, and using this rebound height as a baseline. For example, for 20% butyl, the rebound height was 33 mm and the rebound ratio was 86.8%, e.g., [(33 mm×100%)/38 mm]=86.8%. This curve shows how the rebound % decreases as the butyl % increases. Thus, rebound height and rebound % curves show a similar performance using different parameters on the y-axis.

The impact absorption % curve is related to the % of butyl present in the sample composition (x-axis) and the impact absorption % (y-axis) but referenced to rebound %. This was calculated assuming that with 0% butyl, the rebound height was 38 mm, and using a baseline of 100% for rebound % and 0% for impact absorption. For example, for 20% butyl, the rebound height was 33 mm, the rebound ratio was 86.8% and the impact absorption was and 13.2% (e.g., 100%-86.8%=13.2%). This shows how the impact absorption % increases as the butyl % increases. As shown, in one example, a cross-linked composition of from about 40% by weight to about 80% by weight of butyl has a rebound from about 87 percent to about 24 percent and an absorption from about 13 percent to about 76 percent.

Figure 2:
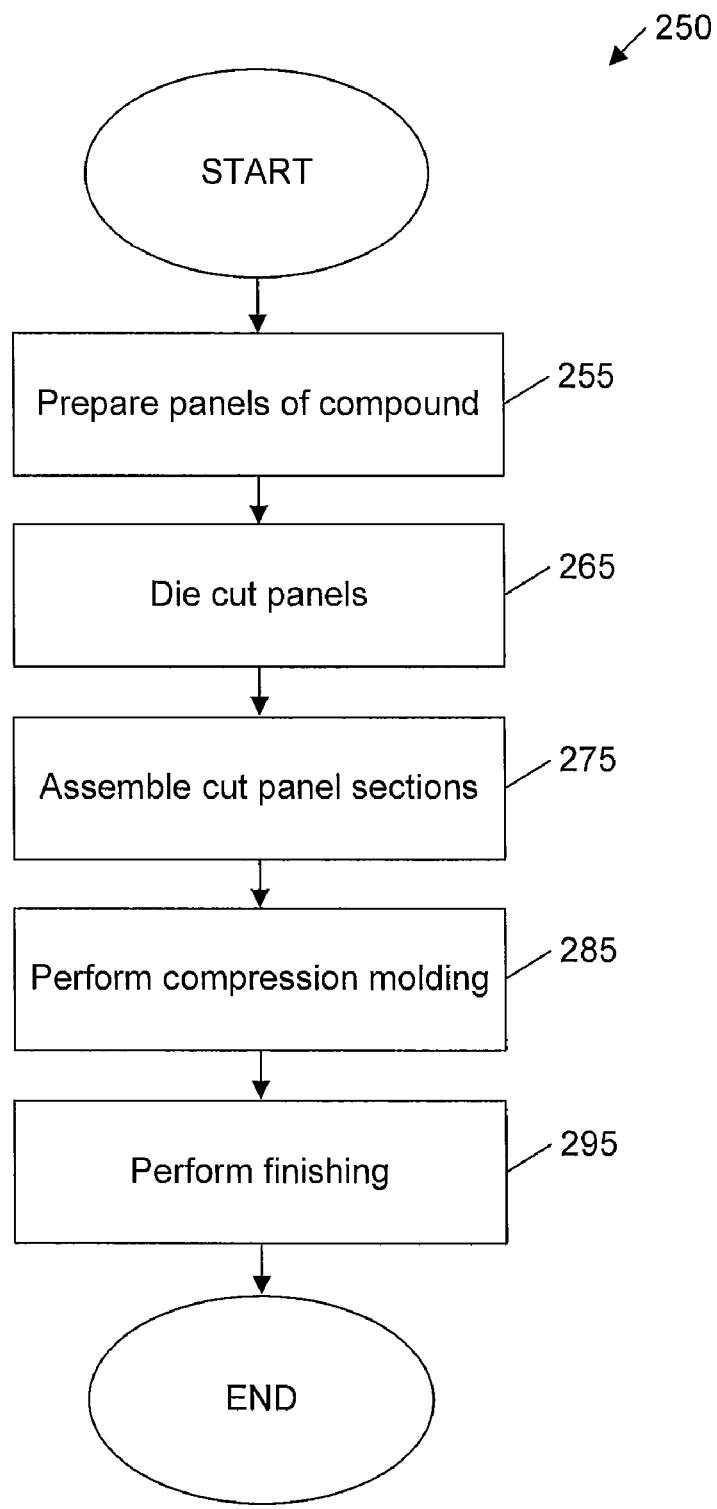
FIG. 2 shows a flowchart for a process of making a grip according to an embodiment.

FIG. 2 illustrates a process 250 for manufacturing a grip from the composition using compression molding. It will be appreciated that references to the composition refer to the various embodiments of the composition described. The process 250 may be used to manufacture a golf club grip. At step 255, a panel of the composition is prepared. In one embodiment, the panel of the composition may be prepared as described above with respect to FIG. 1A. Preparation of the panel of the composition may include, for example, preheating or open milling of the composition.

Continuing at step 265, the panel is die cut into one or more panel sections used to make each grip. In one embodiment, a grip may be formed of two or more panel sections that are compression molded together. At step 265, the panel sections that make up the grip are cut from the panels of the composition. In one embodiment, the panel sections may be cut from the panel by stamping. In one embodiment, one or more different panel sections may have different shapes. For example, in one embodiment, 11 different shapes of panel sections and one cap piece are used to form a grip. Details of the panel sections are described further below with respect to FIGS. 3A-C. In one embodiment, a panel of the composition may be die cut into multiple copies of a single panel section. For example, if two separate panel sections were used to make a grip, two different panels of material could be prepared. A first panel could be cut into multiple copies of the first panel section. Likewise, a second panel could be cut into multiple copies of the second panel section. Each of the first panel sections is then combined with a respective second panel section to form a grip. Advantageously, in this manner, the different panel sections can be made from panels having different thicknesses, different colors, or other different properties. In another embodiment, a single panel can be cut into different shaped panel sections. In another embodiment, the panel sections may be injection molded rather than being cut from a panel.

Figure 3A:
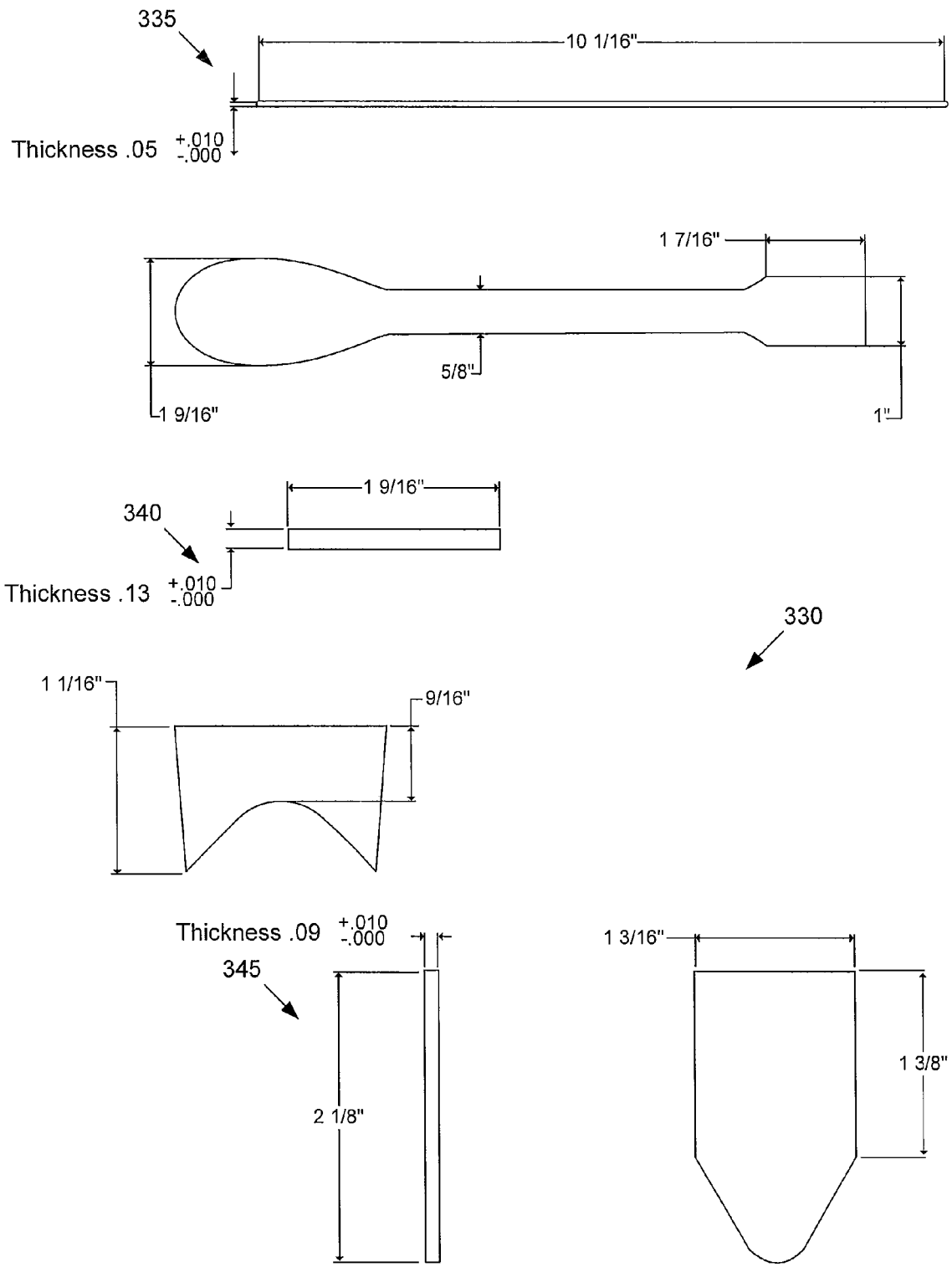
FIG. 3A-C show various views of panel sections for a grip according to an embodiment.
Figure 3B:
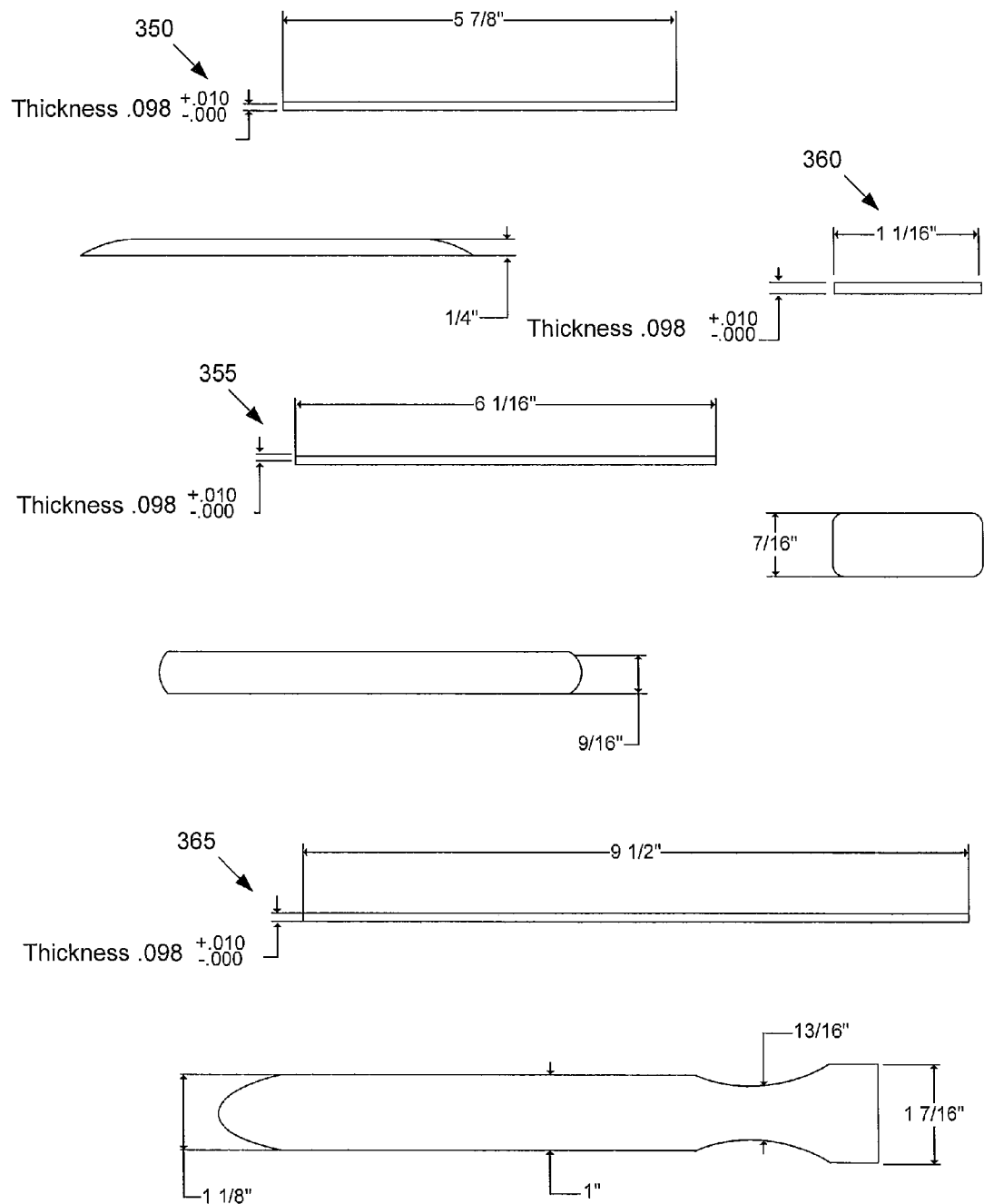
Figure 3C:
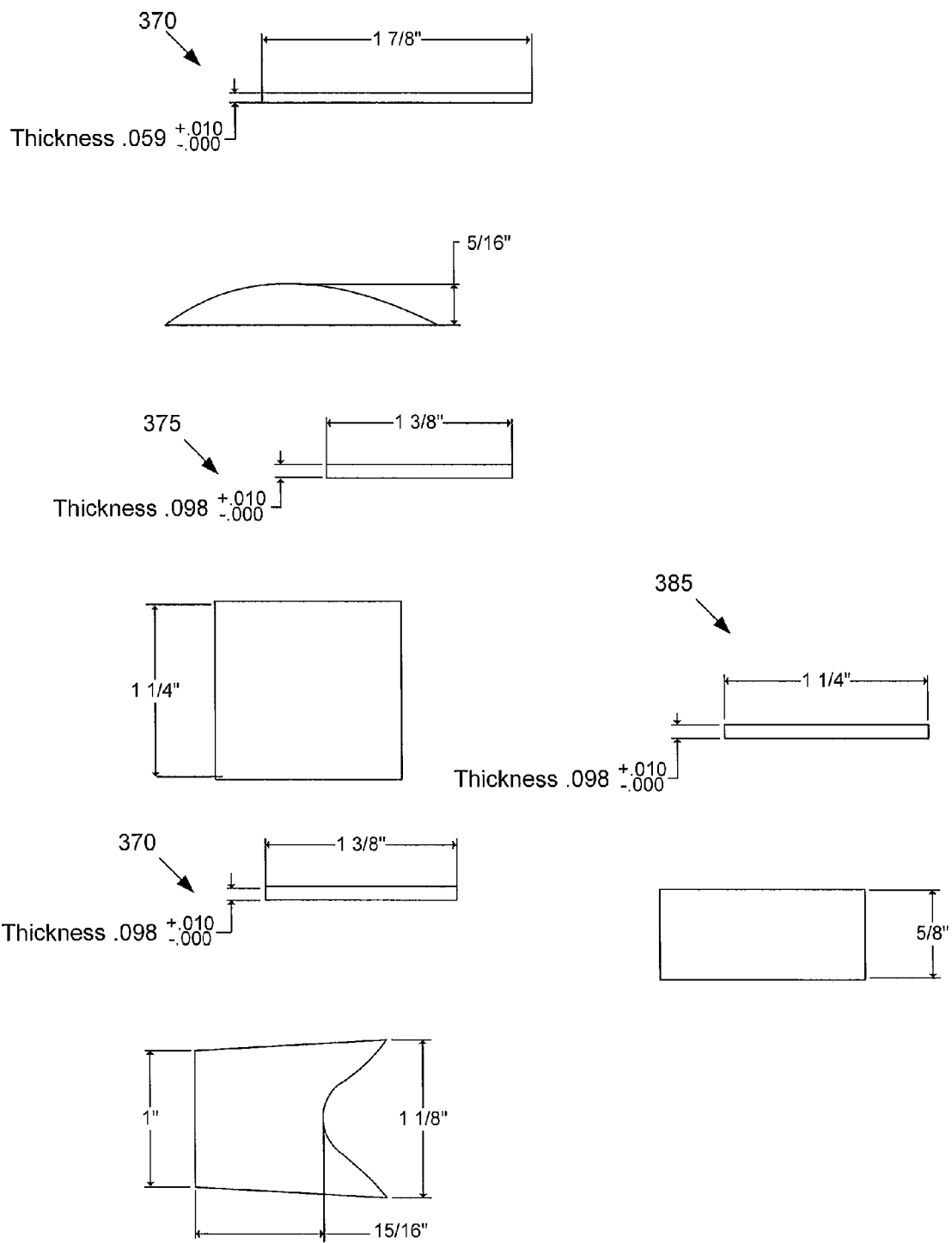
Figure 4A:
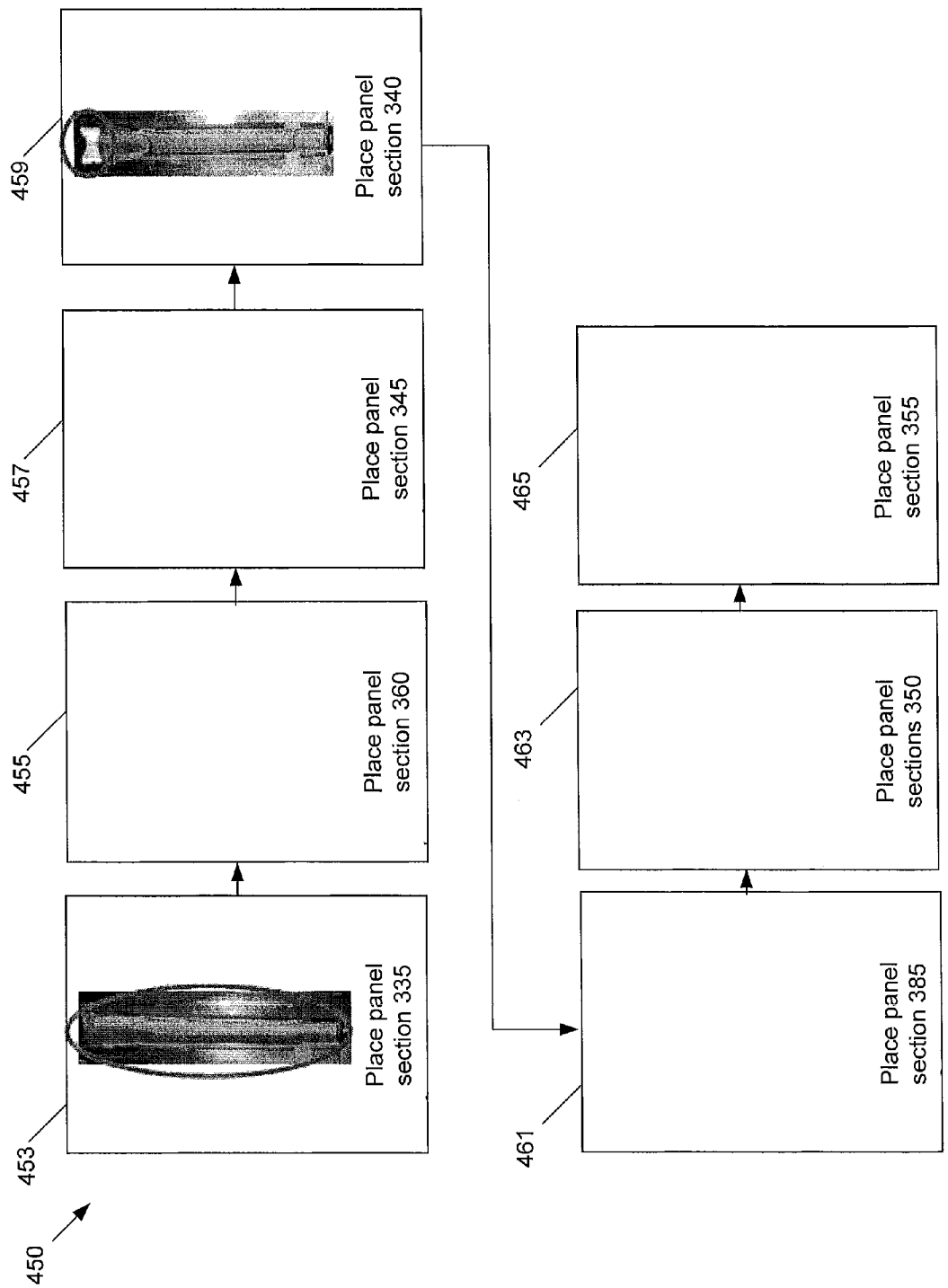
FIG. 4A-B show flowcharts for a process of assembling a grip according to an embodiment.
Figure 4B:
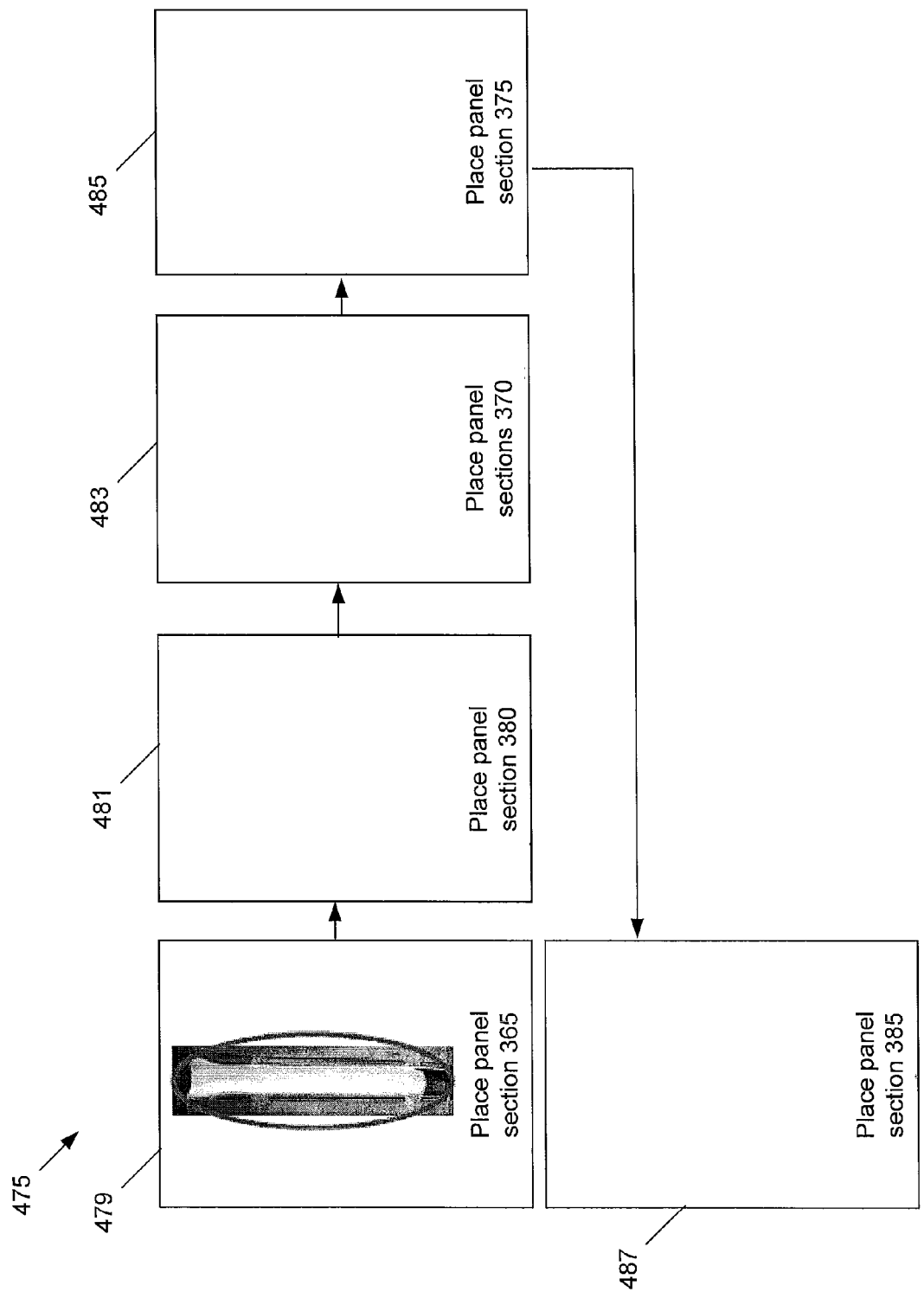

Continuing at step 275, the panel sections are assembled. In one embodiment this may include placing the panel sections into mold negatives. For example, front and back mold negatives may be used. A separate mold section for a cap piece may also be used. The negatives may comprise surface features or textures described in greater detail below. In addition, the negatives may be shaped in order to impart a taper as described in detail below. In one example, the front and back mold negatives each comprise a receiving space shaped approximately as a half cylinder aligned in a direction normal to the radius. One set of panel sections may be placed in the front mold negative. A second set of panel sections may be placed in the back negative. The particular combination of panel sections as well as the shape of the mold negatives may be selected in order to provide the features and characteristics of the grips described herein. For example, panel sections used in the different mold negatives may be predominantly or entirely different colors. In this manner, a grip having different regions of color from the front to back can be made from the composition. One exemplary process for assembling the panel sections of FIGS. 3A-C is illustrated in FIGS. 4A-B below. A pre formed cap can be placed in the cap mold negative.

Continuing at step 285, the assembled panel sections are compression molded into a completed grip. For example, as described above, the panel sections can be assembled in two half cylindrical mold negatives and a cap can be placed in the cap mold negative. A cylindrical core bar is then placed on top of the panels in the back mold negative. The front mold negative is then positioned on top of the core bar. The front and back molds are positioned next to the cap mold. The assembled mold is then heated and allowed to cure. The temperature for the molding process and the cure time may vary depending on the properties, such as color, of the composition that forms the panel sections being used. For example, if black composition is used, the molds may be heated to a temperature of approximately 310° F. with a tolerance of +/−10° F. and allowed to cure for approximately 330 seconds with a tolerance of +/−10 seconds. However, if red material is used, the molds may be heated to a temperature of approximately 290° F. with a tolerance of +/−5° F. and allowed to cure for approximately 350 seconds with a tolerance of +/−10 seconds. If blue composition is used, the molds may be heated to a temperature of approximately 300° F. with a tolerance of +/−10° F. and allowed to cure for approximately 330 seconds with a tolerance of +/−10 seconds. Various combinations of colors and the dimensions of the panel sections being molded can result in different ranges of temperatures and curing times. After curing, the molds are separated, the core bar removed from the molds, and the molded grip is removed from the core bar.

Continuing at step 295, the molded grip is processed with one or more finishing techniques. These techniques may include deflashing, painting, additional curing, grinding, buffing, washing, drying, packaging and other finishing processes. It will be appreciated that throughout the process 250, inspection and quality control steps may be taken.

FIGS. 3A-C illustrate an exemplary set of panel sections 330 that can be used in conjunction with the process 250 of FIG. 2. Profile and top down views are provided for panel sections 335, 340, 345, 350, 355, 360, 365, 370, 375, 380, and 385. As shown, the thickness dimension for the various panel sections may differ. Accordingly, as described with respect to FIG. 2, the panel sections may be cut from panels having different thicknesses. Similarly, the panel sections may be cut from panels having different colors or other properties.

FIGS. 4A-B illustrates processes 450 and 475 for assembling the panel sections in the top and bottom mold negatives. The panel sections being assembled can be the panel sections describe above with respect to FIGS. 3A-C. The processes 450 and 475 may be performed as part of the step 275 of the process 250 described above with respect to FIG. 2. It will be appreciated that the panel section numbers refer to the panel sections identified in FIGS. 3A-C.

Process 450 can include step 453. At step 453, the panel section 335 is placed into the depression on the back mold. At step 455, the panel section 360 is placed on top of a lower portion of the panel section 335. At step 457, the panel section 345 is placed on top of a higher portion of the panel section 335. At step 459, the panel section 340 is placed into the depression on the back mold adjacent to the higher portion of the panel section 355. At step 461, the panel section 385 is placed on top of the panel section 340. At step 463, a copy of panel section 350 is placed into the depression on the back mold on each side of a middle portion of the panel section 335. At step 465, panel section 355 is placed on top of the middle portion of the panel section 335.

Process 475 can include step 479. At step 479, panel section 365 is placed into the depression on the front mold. At step 481, panel section 380 is placed on top of a lower portion of panel section 365. At step 483, a copy of panel section 370 is placed into the depression on the front mold on each side of a higher portion of panel section 365. At step 485, panel section 375 is placed on top of the panel sections 370 and on top of the higher portion of panel section 365. At step 487, panel section 385 is placed on top of panel section 365 in a position higher than the panel section 375. The assembled panel sections may be compression molded as described above with respect to FIG. 2.

Figure 5:
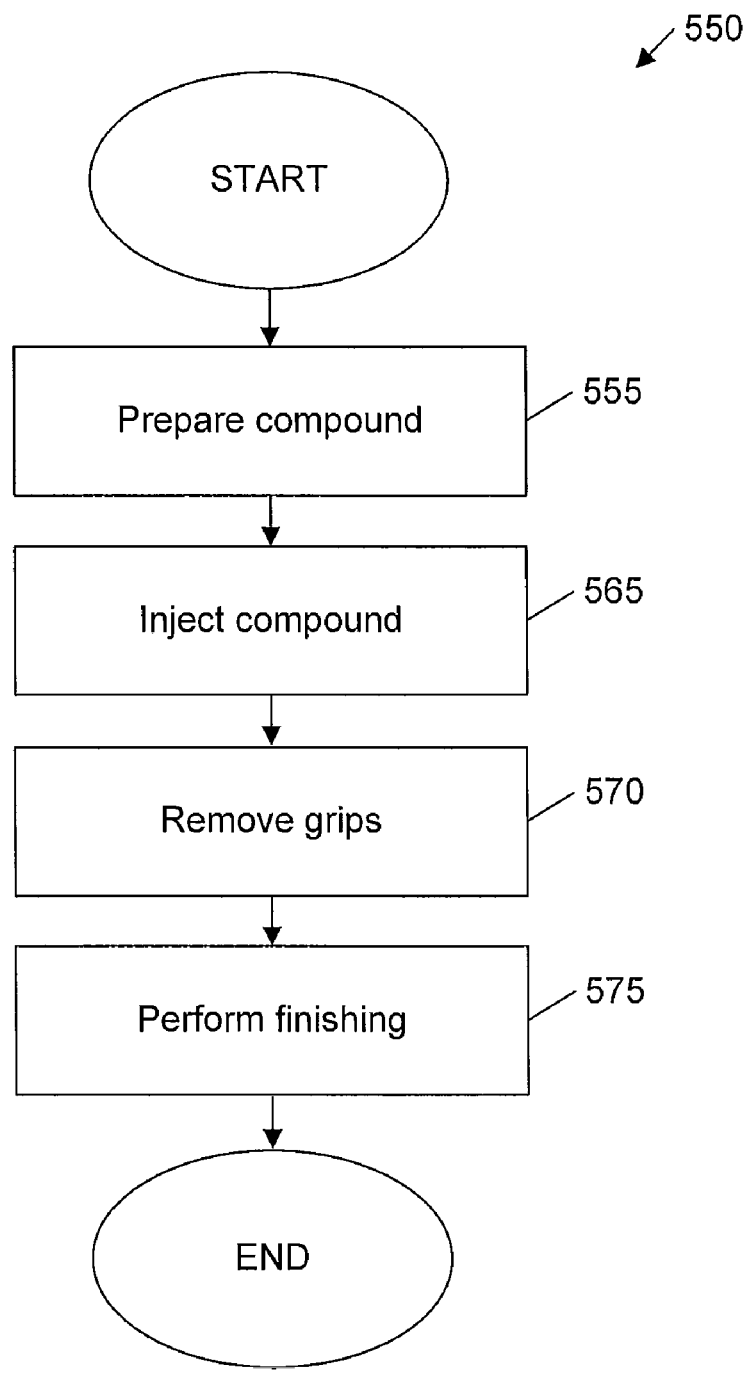
FIG. 5 shows a flowchart for a process of making a grip according to an embodiment.

In another embodiment, the composition may be used to create grips by injection molding. FIG. 5 illustrates a process 550 for injection molding. At step 555, the composition is prepared. This may include one or more of the steps described above with respect to FIG. 1. In addition, step 555 may include preheating the composition before the injection process. This step of preheating can be performed, for example, by open milling.

Continuing at step 565, the composition is injected into a mold and cured. In one embodiment, the molds used for injection molding may comprise surface features and dimensions that result in textures, features, and tapers described in greater detail below. In one embodiment, the textures, features, and tapers resulting from the molds may be similar to the textures, features, and tapers resulting from the compression molding described above with respect to FIG. 2. In addition, a preformed cap section can be placed into a portion of the mold prior to injection of the remaining compound. In one embodiment, the pressure used for injection may range between 2,000 and 2,400 PSI. In one embodiment, temperature and cycle times may vary based on the color of the composition being used. For example, for white composition, the temperature on the molds may be approximately 340° F. and the cycle time may be approximately 380 seconds. For black composition, the temperature on the molds may be approximately 340° F. and the cycle time may be approximately 350 seconds. For blue composition, temperature on the molds may be approximately 340° F. and the cycle time may be approximately 350 seconds. For red composition, the temperature on the molds may be approximately 330° F. and the cycle time may be approximately 350 seconds.

Continuing at step 570, the grips are removed from the molds. At step 575, the molded grip is processed with one or more finishing techniques. These techniques may include deflashing, painting, additional curing, grinding, buffing, washing, drying, packaging and other finishing processes. It will be appreciated that throughout the process 550, inspection and quality control steps may be taken.

Advantageously, the process 550 results in a golf grip that has beneficial absorption and grip characteristics. Additionally, the grip is made entirely from the composition. Other golf grips have attempted to achieve absorption and grip by layering multiple different materials. However, by forming a grip entirely from the composition, the processing difficulties that arise from layering multiple materials can be avoided. In other embodiments, thermoplastic molding or a rubber extrusion process may be used to make the grips.

Figure 6:
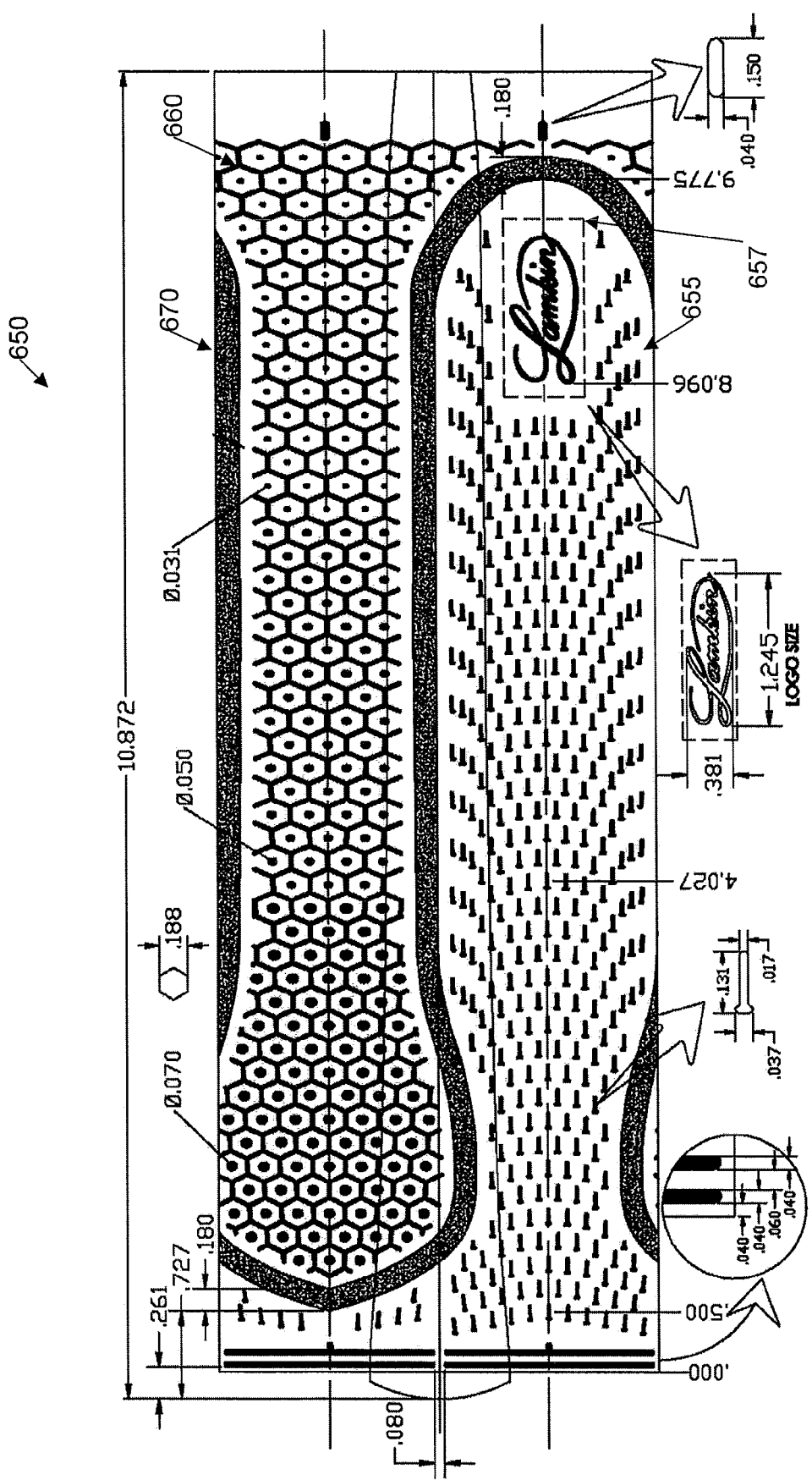
FIG. 6 shows a view of a surface pattern for a grip according to an embodiment.

FIG. 6 illustrates a view 650 of the surface of a grip. In one embodiment, the illustrated grip surface is made according to the compression molding process described above with respect to FIG. 2. The golf grip comprises a front region 655, a logo area 657, a back region 660, and a boundary region 670. The pattern on the front region 655 results from the properties of the mold in the molding process. For example, the T shaped patterns in front region 655 result from raised, T shaped, features on the front mold used in the compression molding process. Accordingly, the T shapes are recesses in the surface of the front region 655. The density and the size of the T features affect the grip properties of the golf grip. For example, the ratio of raised surface area, excluding the area of the recessed Ts, to the total surface area affects the grip properties of the grip. This ratio may be described as a percentage of adhesion area. The T pattern of the front region 655 exhibits approximately 87.5% adhesion area.

In one embodiment, patterns at or above 65% adhesion area are used. In another embodiment, patterns having an adhesion area between 70% and 90% are used. In general, the percentage of adhesion affects the perceived softness and other properties of the grip. Insufficient adhesion area can decrease soft feel provided by the material. In one example, the amount of adhesion area may be altered based on the type of club being handled. For example, a putter can be made with a larger adhesion area to increase the soft feel of the grip. The percentage of adhesion area can also affect the amount of pressure felt by a user. For example, as the surface area contacted by a user's hands decreases, for a fixed force, the pressure exerted increases. Thus, modification of the percentage of adhesion area can affect the pressure felt by a user. Adjustments to this pressure sensation can be adjusted for beneficial user experience. Similarly, percentage of adhesion area and the distribution of surface features can affect the coefficient of friction and thereby alter the amount of grip felt by a user.

The back region 660 comprises a hexagonal pattern. The boundaries between the hexagons are recessed portions. One or more of the hexagons also comprise cylindrical cavities. As illustrated, the diameter of the cylindrical cavities may change along the length of the golf grip. For example, the diameter of the cylindrical cavities may decrease progressing from one end of the golf grip to the other. The rate at which the radius decrease may be stepped, linear, exponential, or according to another progression. Advantageously, by varying the radius of the cylindrical cavities, the grip characteristics can be altered all along the back region 660. In one embodiment, the back region 660 exhibits approximately 73.5% adhesion area when the radius of the cylindrical cavities is at its maximum. This percentage increases along the golf grip as the radius of the cylindrical cavities decreases. Advantageously, a user's experience can be enhanced by providing different patterns with corresponding differences in areas of adhesion between front and back parts of the grip. For example, in a golf grip, a first pattern on the back side can provide one level of feel and properties for the fingers contacting the first pattern. At the same time, a second pattern on the front side of the grip can provide a second level feel and properties for the thumbs contacting the second pattern. This facilitates beneficial levels of control and customization for a user.

The grip also comprises a boundary region 670. In one embodiment, the boundary region 670 comprises a pebbled texture comprising a plurality of small, raised features. Advantageously, the pebbled surface provides beneficial grip characteristics. In addition, the pebbled surface addresses issues that can arise during compression molding. For example, as described above, the front region 655 and the back region 660 can be formed of different colored versions of the composition. The boundary between the colors can be affected by bleeding during the molding process. The pebbled texture of the boundary region can limit the spread of the bleeding. Other textures or patterns could also be used for the boundary region 670. Similarly, the shapes and sizes of the front region 655, back region 660, and boundary region 670 may be altered. The use of the boundary area is optional. In another embodiment, the boundary area 670 may be omitted. In this embodiment, the front region 655 and back region 660 may abut.

It will be appreciated that while a grip made by compression molding has been described in relation to FIG. 6, these or other patterns may also be used for an injection molded grip. In some embodiments, additional or fewer logo areas 657 may be used. In some embodiments, the logos or other features of the grip may be transferred to the grip using a heat transfer label process, an automated painting system, a pad printing process, or another process.

FIGS. 7A-J illustrate patterns that may be incorporated into a grip made from the composition described above. Pattern 7A illustrates a pattern 750. The pattern 750 comprises sets of circles and ovals having different dimensions. In particular, the pattern 750 comprises large circles 751, large ovals 753, small ovals 755, and small circles 757. The different shapes may be formed by grooves in the surface of the grip. In one embodiment, the grooves that form the different shapes can have different depths. For example, the grooves forming the large circles 751 may have a greater depth than the grooves forming the large ovals 753. The grooves forming the small ovals 755 may be less deep than the grooves than the grooves for the large ovals 753. The small circles 757 may be formed by grooves that are less deep than the grooves that form the small ovals 755. In general, the pattern features may be formed by grooves of different depths in order to change the grip characteristics of the grip. Further, the depths of the grooves or other features may change based on the location of the features on the grip.

Advantageously, altering the depth of the grooves provides an opportunity to alter the touch and feel of the grip without changing the percentage of adhesion area. For example, deeper grooves can cause raised surface features to have more give, or perceived malleability, affecting softness and grip. Alternatively, wide, shallow grooves can affect the feel of the grip without as significant an effect on the percentage of adhesion area. Thus the ratio of groove depth to groove width allows additional opportunities to enhance or customize the grip characteristics.

FIG. 7B illustrates another pattern 760. The pattern 760 comprises sets of circles and ovals of varying sizes. The features of pattern 760 provide another variation on the percentage of adhesion area. As with the other patterns, the dimension and depth of the features may be adjusted to change adhesion area percentages and other grip characteristics.

FIG. 7C illustrates another pattern 770. The pattern 770 comprises circular patterns of interleaved, seed shaped, grooves. The features of pattern 770 provide another variation on the percentage of adhesion area. As with the other patterns, the dimension and depth of the features may be adjusted to change adhesion area percentages and other grip characteristics.

FIG. 7D illustrates another pattern 775. The pattern 775 comprises sets crescent grooves arranged approximately as triangles. The features of pattern 775 provide another variation on the percentage of adhesion area. As with the other patterns, the dimension and depth of the features may be adjusted to change adhesion area percentages and other grip characteristics.

FIG. 7E illustrates another pattern 780. The pattern 780 comprises chevrons overlaid in an approximately circular arrangement. The features of pattern 780 provide another variation on the percentage of adhesion area. As with the other patterns, the dimension and depth of the features may be adjusted to change adhesion area percentages and other grip characteristics.

Figure 7A:
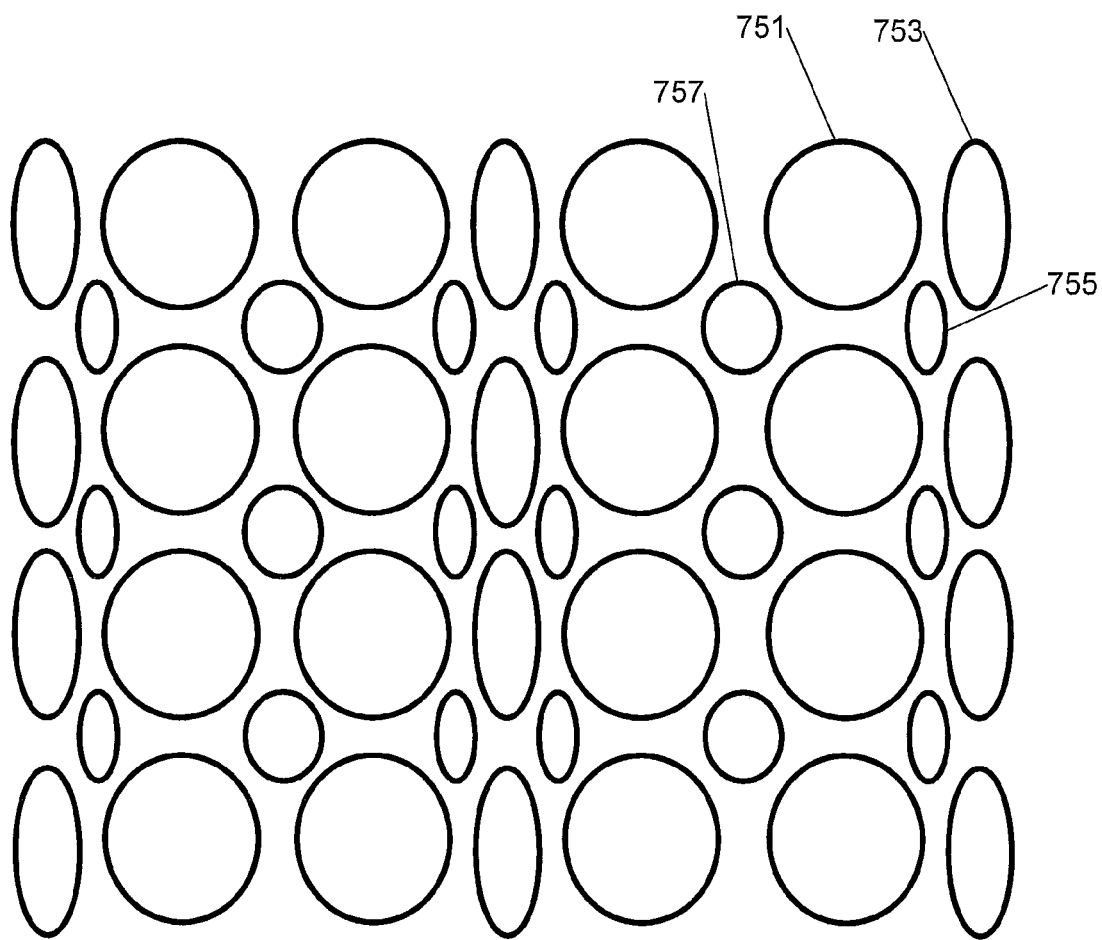
Figure 7F:
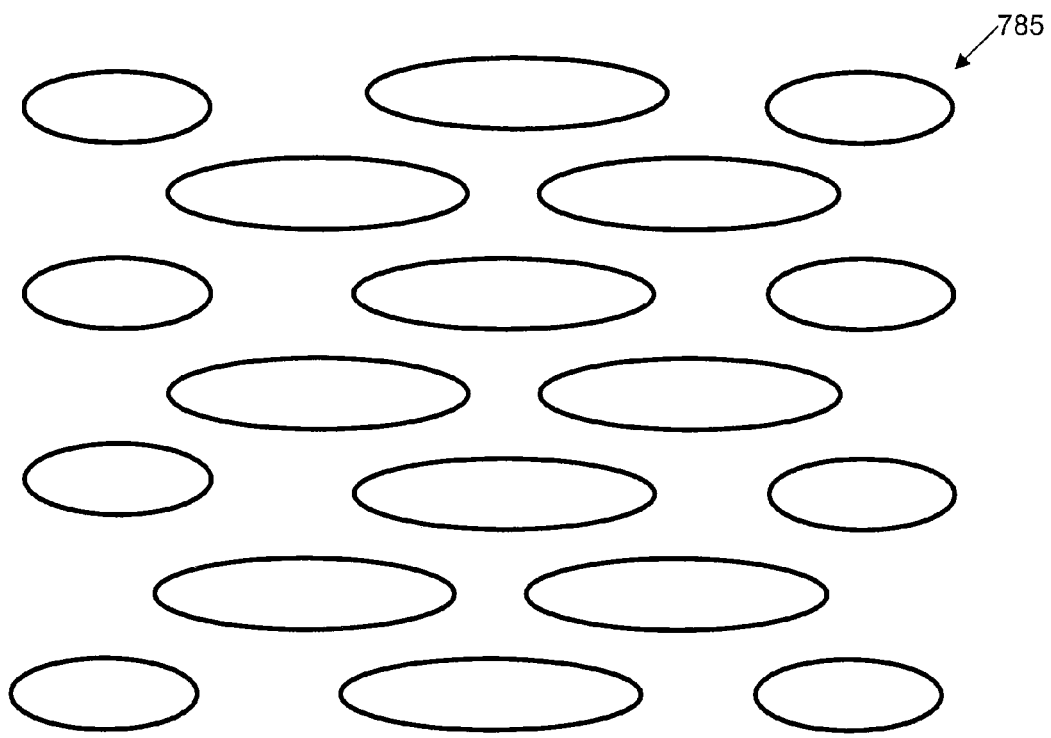

FIG. 7F Illustrates another pattern 785. The pattern 785 comprises sets of ovals of varying sizes. The features of pattern 785 provide another variation on the percentage of adhesion area. As with the other patterns, the dimension and depth of the features may be adjusted to change adhesion area percentages and other grip characteristics.

Figure 7G:
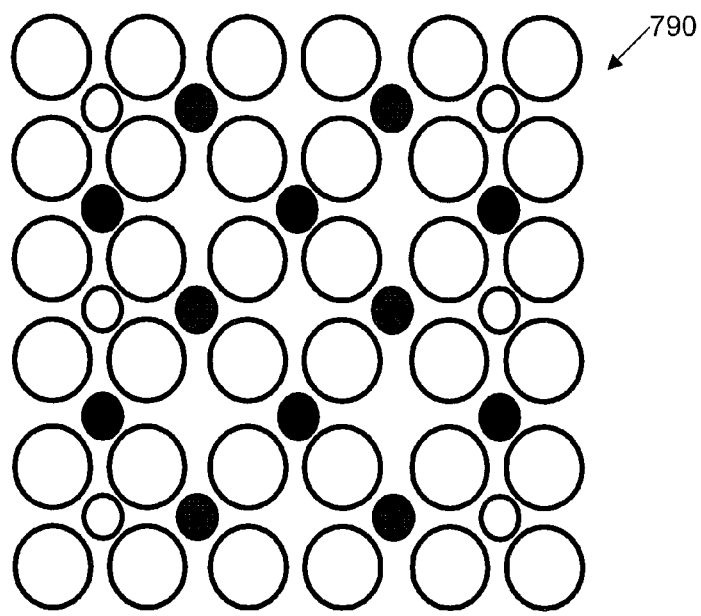

FIG. 7G illustrates a pattern 790. The pattern 790 comprises sets of circles having varying sizes and groove depths. The features of pattern 790 provide another variation on the percentage of adhesion area. As with the other patterns, the dimension and depth of the features may be adjusted to change adhesion area percentages and other grip characteristics.

Figure 7H:
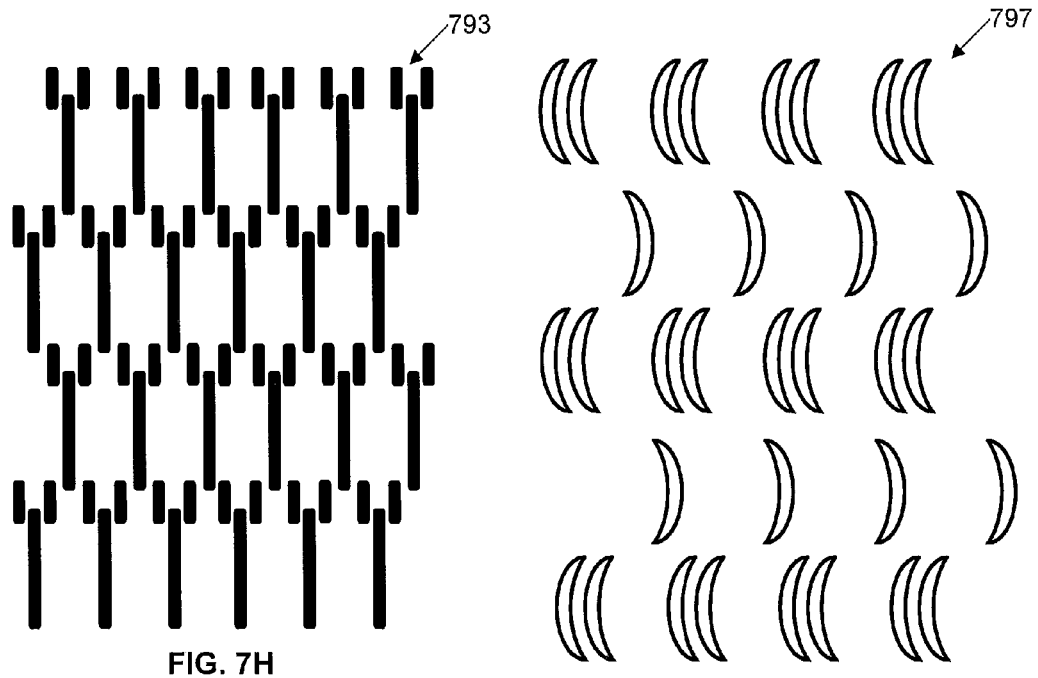

FIG. 7H illustrates a pattern 793. The pattern 793 comprises sets of linear grooves of varying sizes. The features of pattern 793 provide another variation on the percentage of adhesion area. As with the other patterns, the dimension and depth of the features may be adjusted to change adhesion area percentages and other grip characteristics.

Figure 7J:
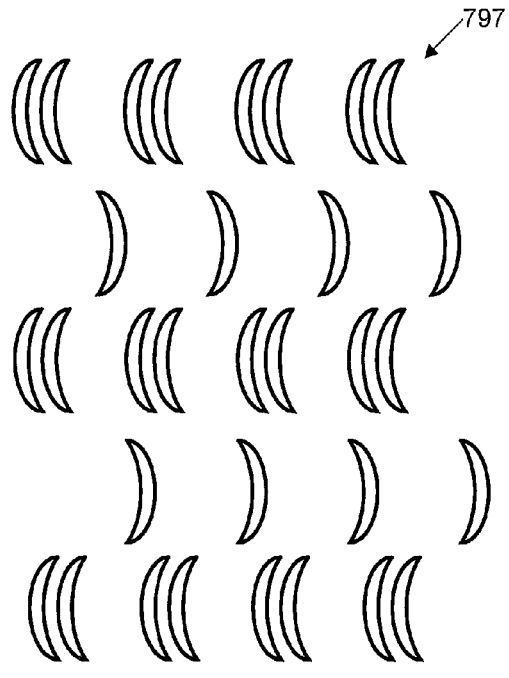
Figure 7I:
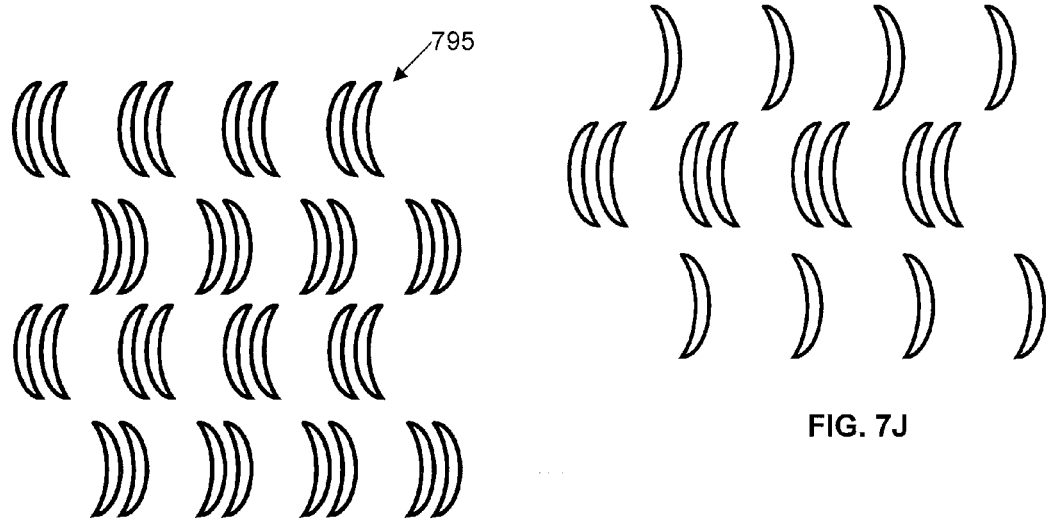

FIG. 7I illustrates a pattern 795. The pattern 795 comprises spaced pairs of crescents. Grooves form the perimeters of the crescents. In each row, the direction the pairs face is alternated. The features of pattern 795 provide another variation on the percentage of adhesion area. As with the other patterns, the dimension and depth of the features may be adjusted to change adhesion area percentages and other grip characteristics.

FIG. 7J illustrates a pattern 797. The pattern 797 comprises crescent grooves. Alternating rows have either pairs of crescents or single crescents. The direction faced by the crescents also varies by row. The features of pattern 797 provide another variation on the percentage of adhesion area. As with the other patterns, the dimension and depth of the features may be adjusted to change adhesion area percentages and other grip characteristics.

Another pattern comprises sets of linear grooves of varying sizes. The pattern has approximately 84.2% adhesion area. As with the other patterns, the dimension and depth of the features may be adjusted to change adhesion area percentages and other grip characteristics.

FIG. 8 illustrates taper characteristics for various grips made from the composition described above. Tables 855, 865, 875, and 885 describe the taper of the various grips at different positions along the length of the grips. For example, as shown in table 855, the taper of the grips is not necessarily linear. Rather, the taper can decrease from an initial high at one end of the grip over the first few inches. In a middle portion of the grip, the taper can decrease to almost zero. Towards the other end of the grip, the taper can increase again. It will be appreciated that other tapers may also be used. The disclosed taper has beneficial effects on grip characteristics. For example, the larger mass of the grip at one ends provides additional support that prevents the club from slipping out of a user's hand at the end of a swing.

Some users have attempted to add taper to grips by adding tape or other materials to shape the grip. However, by adding tape or materials, the grip characteristics of the grip can be negatively affected. Advantageously, grips made from the composition can be molded with the desired taper in order to provide the benefits of the taper without sacrificing the other grip characteristics.

In another embodiment, a grip for a golf club is provided. The grip is comprised of a cross-linked composition of two or more materials which are chosen based on a balance of desired performance characteristics and the manufacturability of the composition. FIG. 9 shows a table that lists performance characteristics for various viscoelastic materials. As shown, butyl rubber has a high degree of vibration dampening, which is a desirable performance characteristic in a golf grip. Butyl rubber by itself, however, does not provide an optimal solution for balanced performance characteristics and manufacturability, due to longer process times required for appropriate cross-linking. In order to provide a grip with a more optimal balance of performance characteristics and manufacturability, additional materials are selected, such as EPDM, which in combination with butyl rubber, result in a composition which not only has good vibration dampening, but also has excellent environmental resistance, moderate hardness as appropriate for comfort, and which has good manufacturability in terms of processing time and energy required. Similarly, the grip may be primarily based on another material which has relatively good vibration dampening, such as Sorbothane, SBR, halogenated butyl rubber, or natural rubber, in combination with one or more secondary materials which provide the balance of desired characteristics, such as better environmental resistance, appropriate hardness and improved manufacturability. As such, the grip is comprised of a cross-linked composition of from about 40% by weight to about 80% by weight of one or more highly dampening viscoelastic materials selected from the group consisting of butyl rubber, ethylene-vinyl acetate, halogenated butyl rubber, polyurethane, styrene butadiene rubber, and Sorbothane, and from about 10% by weight to about 50% by weight of one or a combination of other viscoelastic materials selected from the group consisting of chloroprene rubber, ep rubber, EPDM, nitrile rubber, polypropylene, natural rubber and cork.

It will be appreciated that the present systems and methods may be implemented in a variety of ways. In one embodiment, a golf club comprising a grip made from the composition is provided. In another embodiment, a grip made from the composition is provided. In another embodiment, a method of making a grip from the composition is provided. In another embodiment, a method of attaching a grip made from the composition to a golf club is provided. In another embodiment, a method of making the composition is provided.

The invention claimed is:

1. A grip for a golf club which comprises a cross-linked composition of from about 15% by weight to about 25% by weight of one or a combination of a viscoelastic rubber selected from the group consisting of butyl rubber, nitrile rubber, ethylene propylene rubber and chloroprene rubber, and from about 10% by weight to about 80% by weight of one or a combination of a non-rubber viscoelastic material selected from the group consisting of ethylene-propylene-diene copolymer (EPDM), polyurethane, ethylene-vinyl acetate copolymer, polypropylene and cork.

2. The grip according to claim 1 wherein the viscoelastic rubber is butyl rubber which comprises at least 70% by weight of isobutylene and about 0.1% by weight to about 5% by weight of isoprene.

3. The grip according to claim 2, wherein the butyl rubber has a molecular weight of at least about 200 kpa.

4. The grip according to claim 2, wherein the butyl rubber comprises about 80% by weight to about 94% by weight of isobutylene and about 5% by weight of isoprene.

5. The grip according to claim 1, further comprising from about 10% by weight to about 50% by weight of a filler selected from the group consisting of silica, titanium dioxide, calcium carbonate, barium sulfate, silicon dioxide, carbon black, sand, glass beads, ceramic spheres, mineral aggregates, talc, clay, and thermoplastic microspheres.

6. The grip according to claim 1, further comprising from about 0.1% by weight to about 8% by weight of a plasticizer selected from the group consisting of naphthenic oils, paraffinic oil, aromatic plasticizers, and hydrotreated naphthenic distillate.

7. The grip according to claim 1, wherein the viscoelastic rubber comprises from about 15% by weight to about 25% by weight of butyl rubber and the non-rubber viscoeleastic material comprises from about 20% by weight to about 40% by weight of EPDM.

8. The grip according to claim 7, further comprising from about 10% by weight to about 30% by weight of amorphous silicon dioxide.

9. The grip according to claim 7, further comprising from about 2% by weight to about 4% by weight of a plasticizer, from about 1% by weight to about 10% by weight of a tackifier, and from about 1% to about 10% by weight of a pigment.

10. A grip for a golf club which comprises a cross-linked composition of from about 40% by weight to about 80% by weight of one or a combination of a first material selected from the group consisting of butyl rubber and ethylene propylene rubber, and from about 10% by weight to about 50% by weight of one or a combination of a second material selected from the group consisting of ethylene-propylene-diene copolymer (EPDM), polyurethane, ethylene-vinyl acetate copolymer, polypropylene and cork.

11. The grip according to claim 10, wherein the first material is butyl rubber which comprises at least 70% by weight of isobutylene and about 0.1% by weight to about 5% by weight of isoprene.

12. The grip according to claim 10, wherein the first material comprises from about 45% by weight to about 60% by weight of butyl rubber and the second material comprises from about 30% by weight to about 50% by weight of EPDM.

* * * * *